(12) United States Patent
Lea

(10) Patent No.: US 6,920,135 B1
(45) Date of Patent: Jul. 19, 2005

(54) SCALABLE SWITCHING SYSTEM AND METHOD

(75) Inventor: Chin-Tau Lea, Cupertino, CA (US)

(73) Assignee: Tau Networks, Scotts Valley, CA (US)

( * ) Notice: Subject to any disclaimer, the term of this patent is extended or adjusted under 35 U.S.C. 154(b) by 684 days.

(21) Appl. No.: 09/768,528

(22) Filed: Jan. 23, 2001

(51) Int. Cl.[7] .............................................. H04L 12/28
(52) U.S. Cl. .................. 370/389; 370/421; 370/395.42; 370/412
(58) Field of Search ................................ 370/385, 386, 370/388, 392, 395.4, 395.42, 395.21, 419, 420, 428, 429, 412, 455, 447

(56) References Cited

U.S. PATENT DOCUMENTS

| 5,748,629 A | * | 5/1998 | Caldara et al. | ............. 370/389 |
| 5,859,835 A | * | 1/1999 | Varma et al. | ................ 370/229 |
| 6,148,001 A | * | 11/2000 | Soirinsuo et al. | ........... 370/420 |
| 6,320,864 B1 | * | 11/2001 | Hebb et al. | .................. 370/412 |
| 6,347,087 B1 | * | 2/2002 | Ganesh et al. | .............. 370/392 |
| 6,687,247 B1 | * | 2/2004 | Wilford et al. | ............. 370/392 |

OTHER PUBLICATIONS

PM9311/2/3/5, Enhanced TT1 Chip Set, Enhanced TT1 Switch Fabric Datasheet; Issue 2: Aug. 2000; PMC–Sierra, Inc. pp. i–306.

* cited by examiner

Primary Examiner—Hanh Nguyen
(74) Attorney, Agent, or Firm—Fish & Richardson P.C.

(57) ABSTRACT

Systems and method for switching packets of information between ports are provided. One system comprises a plurality of port processors, a switch fabric and a scheduler. The port processors send packet headers to the scheduler, which resolves contentions between packet headers with the same destination port addresses. The scheduler sends request-grant information to the port processors. The port processors send packets as specified by the request-grant information to the switch fabric. The switch fabric transfers the packets between the port processors according to the destination port addresses of the packets.

25 Claims, 11 Drawing Sheets

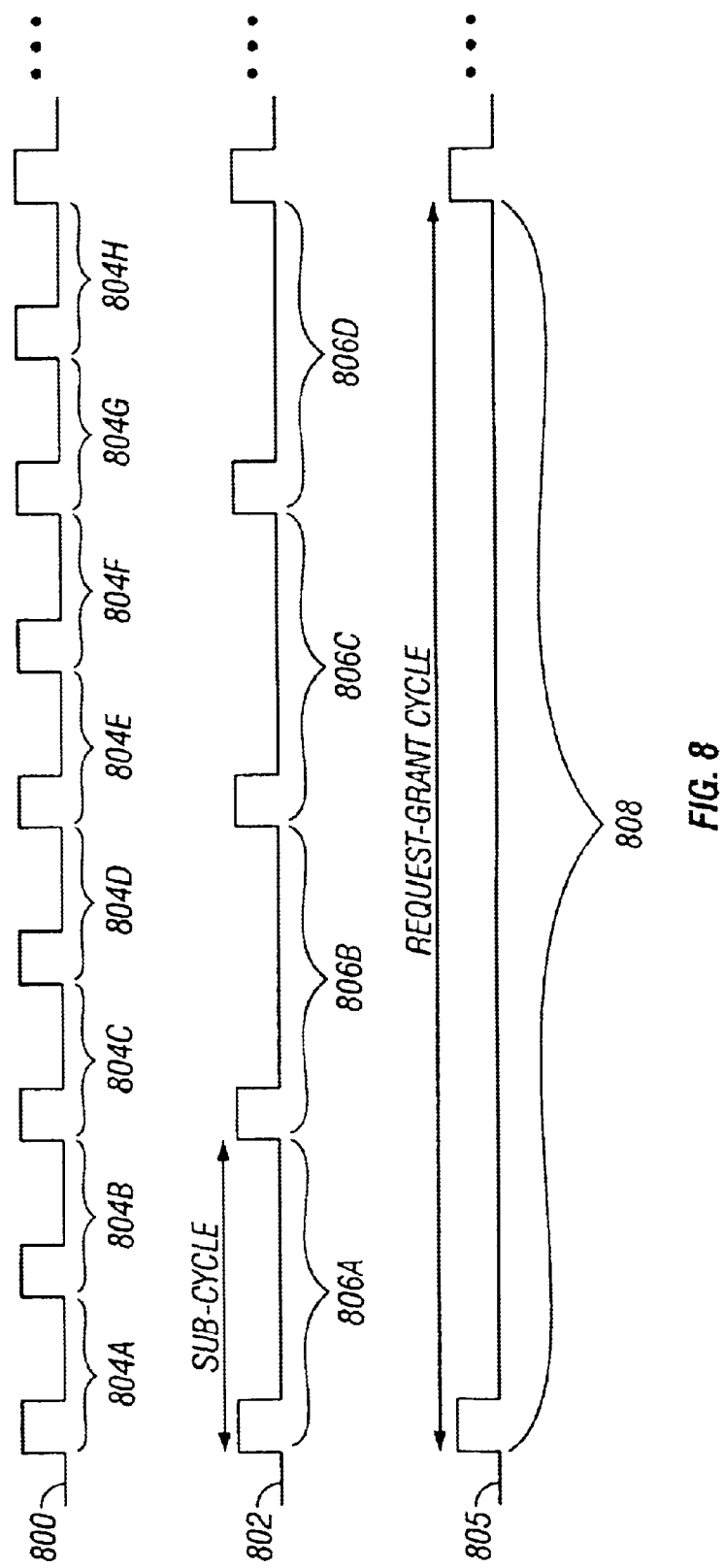

SCALABLE SWITCHING SYSTEM AND METHOD

BACKGROUND OF THE INVENTION

1. Field of the Invention

The present invention relates to communication systems and methods, and in particular to switching systems and methods.

2. Description of the Related Art

Internet demand has pushed bandwidth growth at a long distance carrier's Point Of Presence (POP)(e.g., generally in the form of a switch or router) by five times a year. At this rate, the bandwidth requirement at a POP will be several terabits/sec. The bandwidth explosion is not limited to the Internet backbone. One-gigabit Ethernets have been proposed, and 10 gigabits per second (Gbps) links may be needed to connect the Ethernets.

On the transmission side, Dense Wavelength Division Multiplexing (DWDM) technology has been developed in an attempt to meet the tremendous bandwidth demand. With DWDM technology, a hundred wavelengths may be put on a single fiber, and there is potentially an almost infinite capacity for transmission. In contrast, the capacity of switches and routers has not grown at the same rate, and is significantly lagging behind. The challenge posed by DWDM technology for switching is not just capacity. DWDM also created an explosion in the number of ports for a switch to handle. A hundred wavelengths mean a hundred ports will terminate on a switch. If a switch or router has ten terminating fibers, the switch or router needs to handle 1000 ports.

To keep up with transmission, it is desirable for a switching system to accommodate hundreds or even thousands of ports. The switching system should possess a simplicity that matches the system's ability to scale. Otherwise, a thousand-port switching system may collapse on its own complexity.

Some existing switching systems are designed with single-stage crossbars, which attempt to handle about 32 ports. Some existing switching systems include N. McKwown, "A Fast Switched Backplane For A Gigabit Switched Router," Business Communications Review, December 1997, "Cisco 75000 Router Series datasheet" from Cisco, and "Enhanced TT1 Switch Fabric Datasheet" from PMC-Sierra Inc. But these systems cannot scale, i.e., the structure and scheduling algorithm(s) of these systems prevent the systems from handling more than 32 ports.

SUMMARY OF THE INVENTION

Switching systems and methods are provided in accordance the present invention. Switching systems in accordance with the present invention can schedule and switch packets between hundreds or thousands of ports. One embodiment of a switching system possesses a simplicity that matches the system's ability to scale. One embodiment of a switching system can perform 1024×1024 OC-192 rate scheduling in 20 nanoseconds (ns) or less with current semiconductor technology.

One aspect of the invention relates to a switching system that is configured to switch packets of information between ports. Each packet comprises a header, and each header comprises a destination port address. The switching system comprises a plurality of port processors, a scheduler and a switch fabric. Each port processor is configured to receive and transmit packets of information to and from a line card that is coupled to each port processor. Each port processor is further configured to buffer a plurality of incoming packets from a line card. The scheduler is configured to receive the headers of incoming packets from the port processors. The scheduler is further configured to resolve contentions between headers with destination port addresses that are at least partially similar. The scheduler is further configured to send a request grant to each port processor that sent a header which (a) did not have destination port address that is at least partially similar with destination port addresses of other headers or (b) had a priority level higher than other headers with destination port addresses that are at least partially similar. The switch fabric is configured to receive incoming packets from the port processors as specified by the request grants from the scheduler and transmit the packets to the port processors as specified by the destination port addresses of the packets. Each port processor is configured to transmit packets from the switch fabric to a line card.

Another aspect of the invention relates to a scheduler in a switching system that is configured to switch packets of information between port processors. Each packet comprises a header, and each header comprises a destination port address and a priority level. The scheduler comprises a plurality of randomizers, a first stage of routing modules and a second stage of routing modules. Each randomizer is coupled to a set of port processors. Each randomizer is configured to receive headers from the set of port processors and randomly output the headers. Each routing module in the first stage is coupled to at least two randomizers. Each routing module in the first stage is configured to receive headers from at least two randomizers. Each routing module in the first stage is configured to output one or more headers with a destination address that matches a pre-stored value and have a higher priority level than other headers with destination addresses that match the pre-stored value. Each routing module in the second stage is coupled to at least two routing modules in the first stage. Each routing module in the second stage is configured to receive headers from at least two routing modules in the first stage. Each routing module in the second stage is configured to output an acknowledgment signal to each port processor that sent a header with a destination address that matches a pre-stored value and has a higher priority level than other headers with destination addresses that match the pre-stored value.

Another aspect of the invention relates to a method of switching packets of information between ports. Each packet comprises a header, and each header comprises a destination port address and a priority level. The method comprises buffering a plurality of incoming packets; resolving contentions between headers with destination addresses that are at least partially similar by selecting headers with a higher priority level than other headers with at least partially similar destination addresses; sending one or more request grants to one or more port processors, each request grant representing a header that did not contend with other headers or had a higher priority level than other headers with at least partially similar destination addresses; and switching one or more packets between the port processors based on the one or more request grants.

BRIEF DESCRIPTION OF THE DRAWINGS

FIG. 8 illustrates one embodiment of three clock signals used by the scheduler of FIG. 4.

DETAILED DESCRIPTION

Switch Architecture 101

Figure 1:
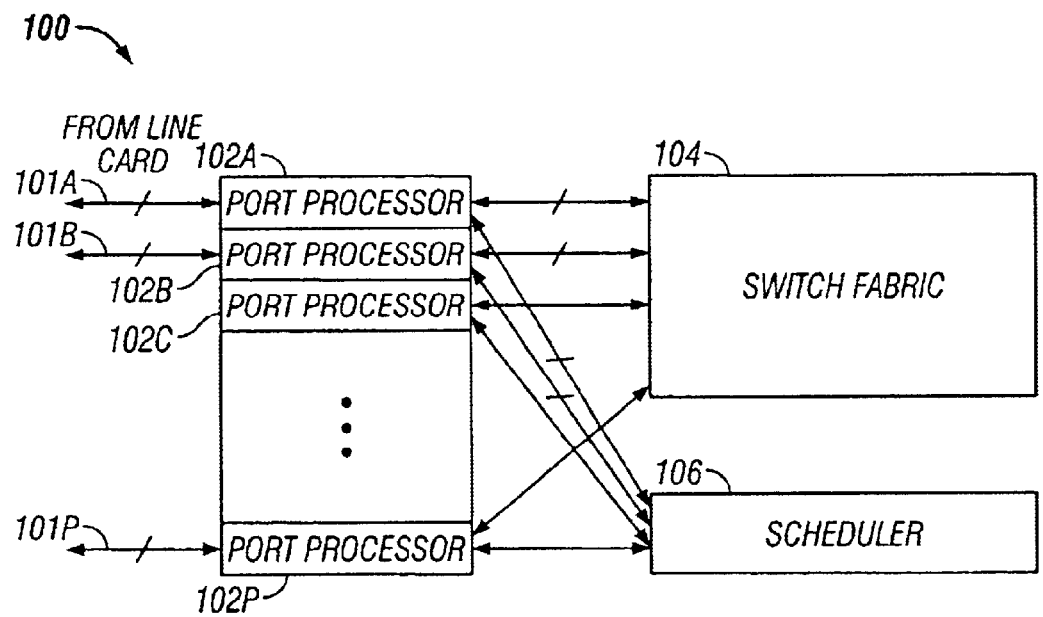
FIG. 1 illustrates one embodiment of an overall switch architecture in accordance with the present invention.

FIG. 1 illustrates one embodiment of an overall switch architecture 100 in accordance with the present invention. The switch architecture 100 in FIG. 1 comprises a plurality of port processors (PPs) 102A–102P, a switch fabric (SF) 104 (also called a switching matrix) and a scheduler 106. The switch architecture 100 may have any number of port processors 102A–102P. For example, in other embodiments, the switch architecture 100 may have 16, 32, 64, 100, 1000 or more port processors. Each port processor 102 in FIG. 1 interfaces with a line card (not shown) via the port 101 using a pre-defined protocol, such as Common Switch Interface (CSIX) or LineCard-to-Switch (LCS), used in the communication industry. A line card is a plug-in electronic printed circuit card that operates features associated with one or more telephones or telephone systems.

In general, the port processors 102A–102P in FIG. 1 receive and buffer incoming packets (also called cells) of information, such as video, audio or data, via the ports 101A–101P. Each cell is intended to be switched from one port 101 to another port 101. Thus, the ports 101A–101P serve as input ports as well as destination/output ports. Multiple cells may be intended for a single output port 101. The port processors 102A–102P buffer the cells, separate a header from each cell, and send the headers to the scheduler 106 for scheduling. The scheduler 106 determines which buffered cells will be switched and output to the ports 101A–101P. The scheduler 106 resolves any contentions between the headers by comparing priority levels of the headers. The scheduler 106 sends a request grant back to each port processor 102 which sent a header that either (a) did not contend with other headers or (b) contended with other headers but had a higher priority level than the contending headers. The port processors 102A–102P send buffered cells specified by the request grants from the scheduler 106 to the switch fabric 104. The switch fabric 104 switches multiple cells simultaneously in a time 'slot' (a cell transmission time) between the input/output ports 101A–101P.

In one embodiment, for OC-192 (~10 Gbps) rates, the scheduler 106 performs scheduling in 20 ns or less. OC-192 relates to Optical Carrier level 192, which is a Synchronous Optical Network (SONET) channel of 9.953 Gbps. SONET is a family of fiber optic transmission rates created to provide flexibility in transporting digital signals with different capacities. SONET provides an optical interface standard that allows inter-working of transmission products from multiple vendors.

Port Processors 102A–102P

Figure 2:
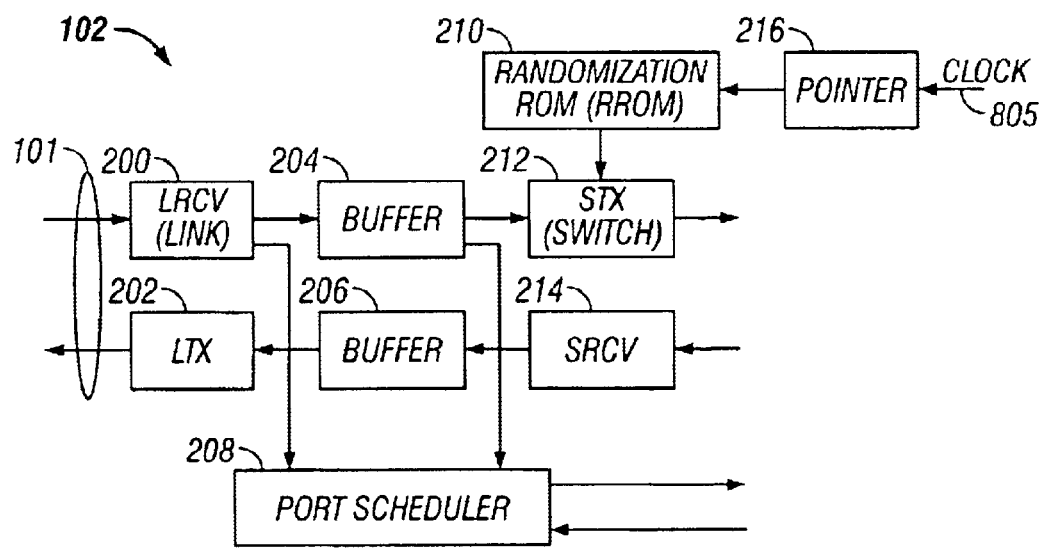
FIG. 2 illustrates one embodiment of a port processor in the switch architecture of FIG. 1.

FIG. 2 illustrates one embodiment of a port processor 102 in the switch architecture 100 of FIG. 1. The processor 102 in FIG. 2 comprises a link receiver (LRCV) 200, a link transmitter (LTX) 202, a first buffer 204, a second buffer 206, a port scheduler 208, a randomization read-only memory (RROM) 210, a switch transmitter (STX) 212, a switch receiver (SRCV) 214 and a pointer 216.

The link receiver 200 and the link transmitter 202 in FIG. 2 are configured to perform protocol functions with a line card (not shown) via input and output portions of the input/output port 101, respectively. The link receiver 200 in FIG. 2 receives cells of information from a line card (not shown) via the input portion of the input/output port 101. A 'cell' is a fixed-size packet for transmission in various communication systems, such as Switched Multimegabit Data Service (SMDS) and Asynchronous Transfer Mode (ATM). The cell comprises a header 330 (FIG. 3A) and a trailer (not shown), which comprises data bits.

Figure 3A:
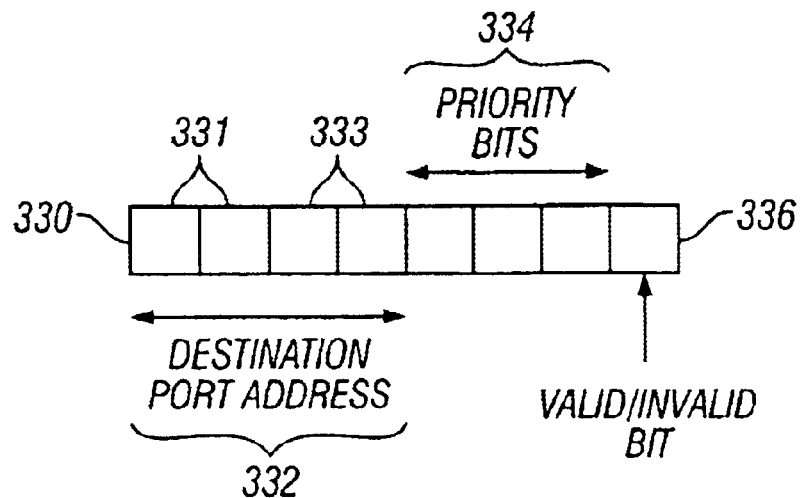
FIG. 3A illustrates one embodiment of a header of a cell received by the port processor in FIG. 2.

FIG. 3A illustrates one embodiment of a header 330 of a cell received by the link receiver 200 in FIG. 2. The cell header 330 in FIG. 3A is a byte of information comprising a four-bit destination port address field 332, a three-bit priority field 334 (three bits for eight priority levels), and a one-bit valid/invalid field 336. The four-bit destination port address field 332 specifies one of sixteen possible output ports 101A–101P (FIG. 1) for outputting the cell received by the link receiver 200 (FIG. 2).

The format of the header 330 in FIG. 3A is shown only as an example. The size of each field in the header 330 may be larger or smaller, depending on the number of destination ports 101A–101P (FIG. 1), the size of the scheduler 106, the size of the switch fabric 104 and other factors. For example, in one configuration, the destination port address field 332 is seven bits wide and specifies one of 128 possible output ports for a switch architecture 100 (FIG. 1) with 128 ports.

The link receiver 200 in FIG. 2 sends incoming cells or cell headers to the port scheduler 208. The link receiver 200 or the port scheduler 208 separates the cell header 330 (FIG. 3A) from each incoming cell. The port scheduler 208 (FIG. 2) sends each cell header 330 (FIG. 3A) to the scheduler 106 in FIG. 1.

The scheduler 106 determines which incoming cells will be switched to output ports 101A–101P based on the cell headers, as described below with reference to FIGS. 4–9. The scheduler 106 sends request grant information back to the port scheduler 208 in FIG. 2. The link receiver 200 in FIG. 2 also sends the cells to the first buffer 204, where the cells are temporarily stored in a queue until the scheduler 106 (FIG. 1) determines which incoming cells will be switched to output ports 101A–101P.

Figure 3B:
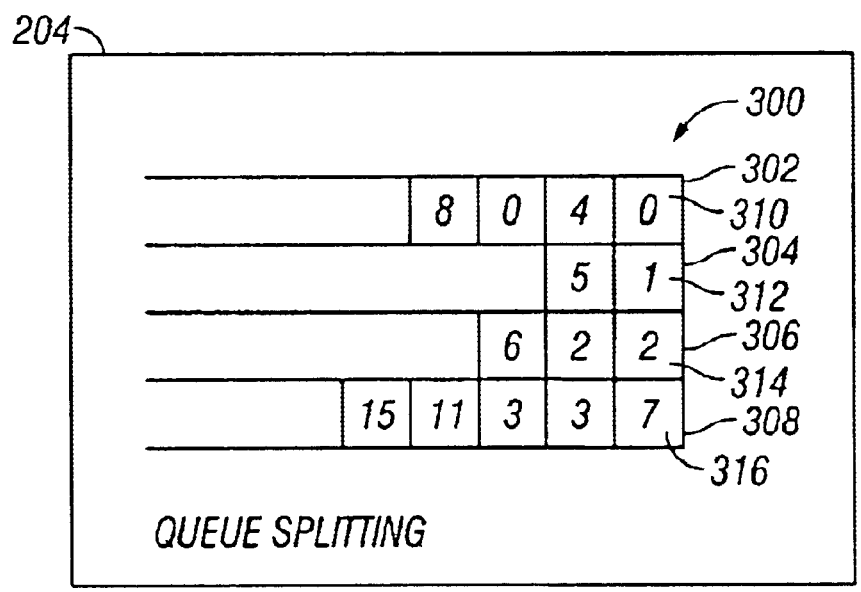
FIG. 3B illustrates one embodiment of a queue in a first buffer in the port processor of FIG. 2.

FIG. 3B illustrates one embodiment of a queue 300 comprising multiple sub-queues 302, 304, 306, 308 in the first buffer 204 of FIG. 2. Multiple sub-queues 302, 304, 306, 308 (FIG. 3B) may reduce the number of contentions between cell headers in the scheduler 106 (FIG. 1), as described below with reference to FIG. 4. In FIG. 3B, there are four sub-queues 302, 304, 306, 308, but other embodiments may select or configure any suitable number of sub-queues.

The first buffer 204 in FIG. 2 routes each incoming cell from the link receiver 200 into one of the four sub-queues 302, 304, 306, 308 (FIG. 3B) based on the destination port address field 332 (FIG. 3A) of each cell. In FIG. 3B, the first sub-queue 302 stores cells with '00' as the last two bits of their destination port addresses, such as cells with destination addresses of 8 ('1000'), 0 ('0000') and 4 ('0100'). The second sub-queue 304 stores cells with '01' as the last two bits of their destination port addresses, such as cells with destination addresses of 5 ('0101') and 1 ('0001'). The third sub-queue 306 stores cells with '10' as the last two bits of their destination port addresses, such as cells with destination addresses of 6 ('0110') and 2 ('0010'). The fourth sub-queue 308 stores cells with '11' as the last two bits of their destination port addresses, such as cells with destination addresses of 15 ('1111'), 11 ('1011'), 3 ('0011') and 7 ('0111').

In other embodiments, the first buffer 204 in FIG. 2 routes each incoming cell into one of the four sub-queues 302, 304, 306, 308 (FIG. 3B) based on the first two bits or middle two bits of the destination port address field 332 (FIG. 3A) of each cell.

When the port scheduler 208 (FIG. 2) receives request grant information from the scheduler 106 (FIG. 1), the port scheduler 208 (FIG. 2) instructs the first buffer 204 to send a cell from one of the four sub-queues 302, 304, 306, 308 (FIG. 3B) to the switch transmitter 212 (FIG. 2). The switch transmitter 212 transmits cells to the switch fabric 104 (FIG. 1), and the switch receiver 214 (FIG. 2) receives cells from the switch fabric 104 (FIG. 1).

The RROM 210 in FIG. 2 stores a plurality of randomization permutations or entries. In one embodiment, the RROMs 210 (FIG. 2) in all of the port processors 102A–102P of FIG. 1 have the same randomization permutations. Also, the RROM 210 in each port processor 102 may have the same randomization permutations as a RROM 608 (FIG. 6) in each randomizer 500 (FIG. 5) of the scheduler 106 (FIG. 1), as described below. Manufacturing costs for this embodiment may be reduced because the same RROM is implemented in all of the port processors 102A–102P (FIGS. 1 and 2) and all of the randomizers 500A–500D (FIG. 5) of the scheduler 106 (FIG. 1). In another embodiment, the randomization permutations in the RROM 210 (FIG. 2) of the port processors 102A–102P (FIG. 1) are different than the randomization permutations in the RROM 608 (FIG. 6) in the randomizers 500A–500D (FIG. 5) of the scheduler 106 (FIG. 1).

Figure 6:
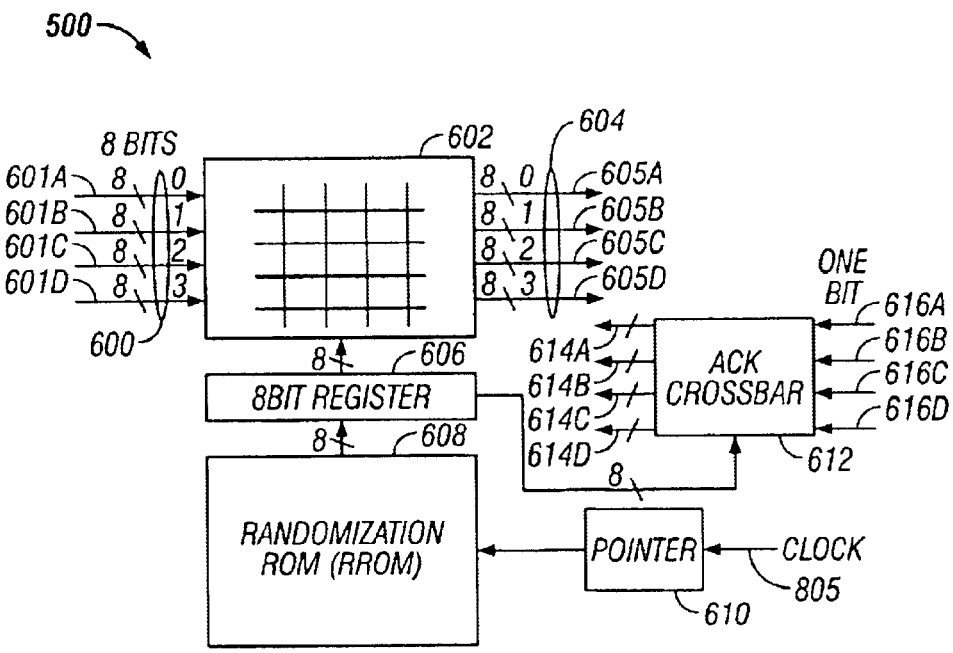
FIG. 6 illustrates one embodiment of a randomizer in the scheduler's switch fabric of FIG. 5.

The RROM 210 in FIG. 2 and the RROM 608 in FIG. 6 may each store any number of randomization permutations, such as 64, 100 or 128 randomization permutations. In one embodiment, the RROM 210 (FIG. 2) and the RROM 608 (FIG. 6) each store several hundred permutations.

The pointer 216 (FIG. 2) in each port processor 102 (FIG. 1) is synchronized with a pointer 610 (FIG. 6) in one of the randomizers 500A–500D (FIG. 5), as described below. The synchronized pointers 216 (FIG. 2), 610 (FIG. 6) allow each routing module 903 (FIG. 9A) in the first stage 910 of the switch fabric 104 to route cells in the same manner as a corresponding randomizer 500 (FIG. 5) routes cell headers in the scheduler 104 (FIG. 1). For example, the second routing module 903B (FIG. 9A) routes cells in the same order as the second randomizer 500A (FIG. 5) routes cell headers.

Figure 4:
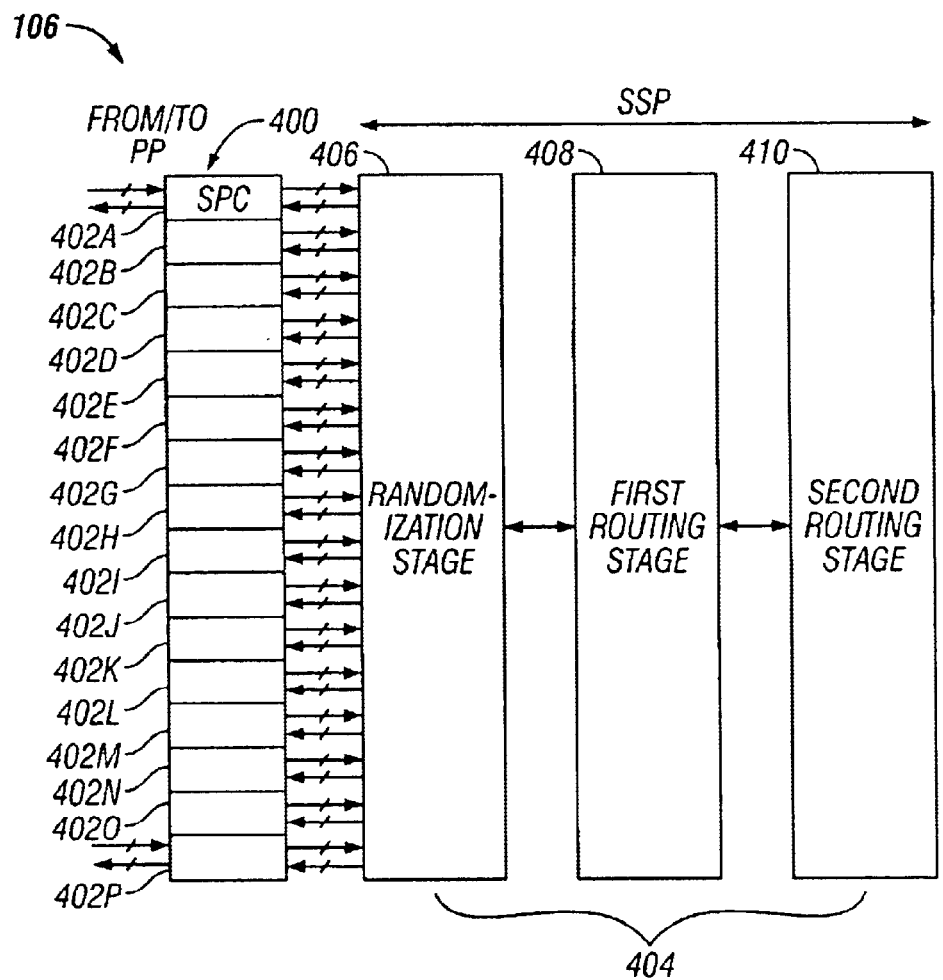
FIG. 4 illustrates one embodiment of the scheduler in the switch architecture of FIG. 1.

Each pointer 610 (FIG. 6) in a randomizer 500 (FIG. 5) of the scheduler 106 (FIG. 1) selects one of the randomization permutations from the RROM 608 (FIG. 6) at the beginning of each request-grant cycle 808 (FIG. 8) to send to a register 606 (FIG. 6). A crossbar/switching network 602 uses the selected randomization permutation in the register 606 to randomly route cell headers on input lines 601A–601D to output lines 605A–605D. Each randomization permutation minimizes bottlenecks caused by multiple input cells headers intended for the same routing module 502 (FIG. 5) in a first routing stage 408 of the scheduler 106 (FIG. 4). Each randomization permutation in the RROM 210 (FIG. 2) and the RROM 608 (FIG. 6) represents a random permutation, which is a one-to-one mapping between the input lines 601A–601D (FIG. 6) and the output lines 605A–605D of a randomizer 500.

When a cell is ready to be sent by a port processor 102 (FIG. 1) to the switch fabric 104, the port processor 104 will first retrieve an entry from the RROM 210 (FIG. 2). Two bits in the entry represent an output line of a first-stage routing module 903 (FIG. 9A), which performs the randomization function. The port processor 102 (FIG. 1) appends the two bits to the destination port address field 332 (FIG. 3A) of each cell. Each routing module 903 (FIG. 9A) in the first stage 910 of the switch fabric 104 (FIG. 1) uses the two bits to route cells from input lines 901 (FIG. 9A) to output lines 905.

Each randomization sequence in the RROM 210 (FIG. 2) and the RROM 608 (FIG. 6) may comprise any suitable number of bits. In one embodiment, each entry in the RROM 210 (FIG. 2) and the RROM 608 (FIG. 6) comprises eight bits (four output addresses and each has two bits). An 8-bit randomization permutation allows a randomizer 500 (FIG. 5) in the scheduler 106 (FIG. 1) to randomly route four cell headers on four input lines 600 (FIG. 6) of the crossbar/switching network 602 to four output lines 604. The eight bits comprises four pairs of bits, and each pair designates a different output line 605. For example, a randomization permutation of 10011100 (2, 1, 3, 0) instructs a randomizer 500 (FIG. 6) to route a first cell header on a '0' input line 601A to the '2' output line 605C, a second cell header on the '1' input line 601B to the '1' output line 605B, a third cell header on the '2' input line 601C to the '3' output line 605D, and a fourth cell header on the '3' input line 601D to the '0' output line 605A.

In another embodiment, each permutation entry in the RROM 210 (FIG. 2) and the RROM 608 (FIG. 6) is 24 bits wide to accommodate random routing of eight cells on eight input lines of the crossbar 602 (FIG. 6) to eight output lines. In another embodiment, each permutation in the RROM 210 (FIG. 2) and the RROM 608 (FIG. 6) is 64 bits wide to accommodate random routing of 16 cells on 16 input lines of the crossbar 602 (FIG. 6) to 16 output lines.

Figure 5:
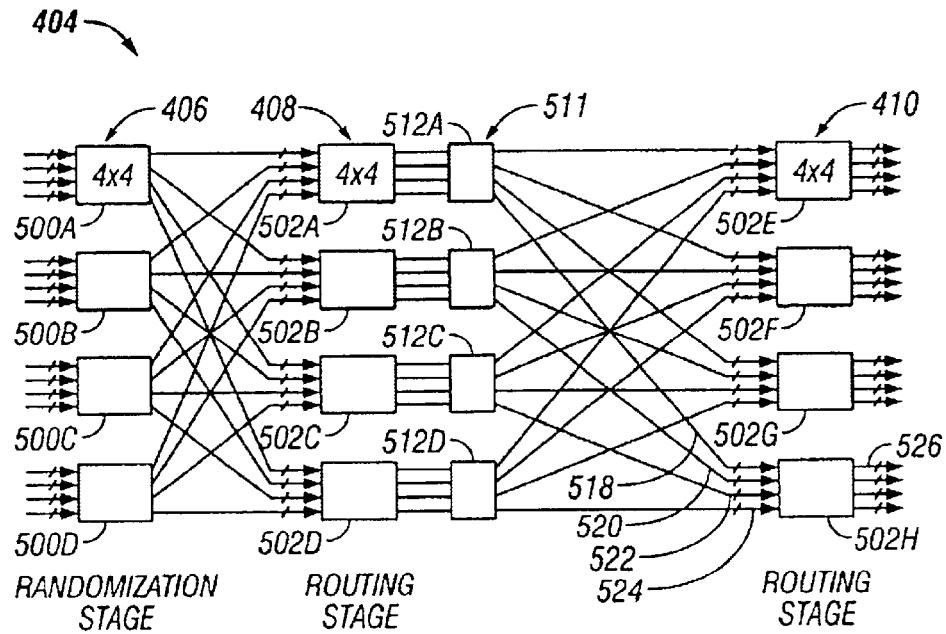
FIG. 5 illustrates one embodiment of a scheduler's switch fabric in the scheduler of FIG. 4.

Each of the 16 port processors 102A–102P in FIG. 1 may have RROMs 210 (FIG. 2) with similar randomization permutations, but the value of the pointers 216 in the port processors 102A–102P (FIG. 1) may be different. For example, the pointers 216 (FIG. 2) in the first set of four port processors 102A–102D in FIG. 1 may have a first pointer value, which is synchronized with the pointer 610 (FIG. 6) in the first randomizer 500A (FIG. 5). The pointers 216 (FIG. 2) in the second set of four port processors 102E–102H in FIG. 1 may have a second pointer value, which is synchronized with the pointer 610 (FIG. 6) in the second randomizer 500B (FIG. 5). The pointers 216 (FIG. 2) in the third set of four port processors 102I–102L in FIG. 1 may have a third pointer value, which is synchronized with the pointer 610 (FIG. 6) in the third randomizer 500C (FIG. 5). The pointers 216 (FIG. 2) in the fourth set of four port processors 102M–102P may have a fourth pointer value, which is synchronized with the pointer 610 (FIG. 6) in the fourth randomizer 500D (FIG. 5).

As described above, the synchronized pointers 216 (FIG. 2), 610 (FIG. 6) allow each routing module 903 in the first stage 910 (FIG. 9) of the switch fabric 104 to route cells in the same order as a corresponding randomizer 500 routes cell headers in the scheduler 106 (FIG. 1).

The switch fabric 104 (FIG. 1) routes cells from the switch transmitter 212 (FIG. 2) of one port processor 102 (FIG. 1) to the switch receiver 214 of another port processor 102. The switch receiver 214 (FIG. 2) in each port processor 102 (FIG. 1) is configured to receive a cell that has been successfully routed by the switch fabric 104 (FIG. 1). The switch receiver 214 (FIG. 2) sends the cell to the second buffer 206 for temporary storage. The line card (not shown) may send a signal to the link transmitter 202 using a protocol, such as Common Switch Interface (CSIX), to indicate that the line card is ready or not ready to receive a cell from the link transmitter 202 via a transmitting portion of the input/output port 101. When the line card is ready, the link transmitter 202 retrieves the cell stored in the second buffer 206 and sends the cell to the line card.

At the end of each time slot (after a cell is switched by the switch fabric 104 (FIG. 1) to a destination port 101A–101P, the pointer 216 (FIG. 2) in each port processor 102 (FIG. 1) is incremented, in the same manner as the pointer 610 (FIG. 6) in each randomizer 500 (FIG. 5) is incremented after each slot. As described above, the contents of the RROMs 608 (FIG. 6), 210 (FIG. 2) are the same and the pointers 610 (FIG. 6), 216 (FIG. 2) are synchronized according to the slot number. This allows the first stage of routing modules 903A–903D (FIG. 9) in the switch fabric 104 to route cells in the same manner as the randomizers 500A–500D (FIG. 5) route cell headers in the scheduler 106.

Scheduler 106

FIG. 4 illustrates one embodiment of the scheduler 106 in the switch architecture 100 of FIG. 1. In one embodiment, the scheduler 106 in FIG. 4 is a single integrated circuit chip. The scheduler 106 in FIG. 4 comprises a set 400 of scheduler port controllers (SPCs) 402A–402P and a scheduler's switch fabric (SSF) 404. The scheduler's switch fabric 404 comprises three stages of crossbars: a randomization stage 406, a first routing stage 408 and a second routing stage 410.

The scheduler 106 in FIG. 4 has 16 scheduler port controllers 402A–402P to correspond with the 16 port processors 102A–102P in FIG. 1. In other embodiments, the scheduler 106 may have more than 16 or less than 16 scheduler port controllers. For example, the scheduler 106 may have 32, 64, 100, 1000 or more scheduler port controllers.

In FIG. 4, each scheduler port controller 402 has four sub-queues (not shown), which are similar to the four sub-queues 310, 312, 314, 316 (FIG. 3B) in a corresponding port processor 102 (FIG. 1), except the sub-queues in the scheduler port controllers 402A–402P (FIG. 4) store cell headers 330 (FIG. 3A). The port scheduler 208 (FIG. 2) of each port processor 102 (FIG. 1) sends cell headers 330 (FIG. 3A) of incoming cells to a corresponding scheduler port controller 402 (FIG. 4) in the scheduler 106. The scheduler port controller 402 stores cell headers 330 (FIG. 3A) in four sub-queues in the same order as the cells stored in the sub-queues 310, 312, 314, 316 (FIG. 3B) of the port processor 102 (FIG. 1). Each scheduler port controller 402 in FIG. 4 sends a cell header 330 (FIG. 3A) from one sub-queue at a time to the randomization stage 406 (FIG. 4) of the scheduler's switch fabric 404.

FIG. 5 illustrates one embodiment of the scheduler's switch fabric 404 in the scheduler 106 of FIG. 4. The randomization stage 406 in FIG. 5 comprises four 4x4 randomizers 500A–500D. In other embodiments, the randomization stage 406 may have more than four or less than four 4x4 randomizers. Also, each randomizer may be configured with more than four or less than four input and output lines. For example, each randomizer may have eight input lines and eight output lines.

The first routing stage 408 comprises four 4x4 routing modules 502A–502D, and the second routing stage 410 comprises four routing modules 502E–502H. Between the first and the second routing stages 408, 410 is a stage of registers 511 that stores the outputs of the first routing stage 408. The stage of registers 511 also provides the inputs for the second routing stage 410. In other embodiments, the first and second routing stages 408, 410 may have more than four or less than four 4x4 routing modules. Also, each routing module may be configured with more than four or less than four input lines and output lines. For example, each routing module in the first and second routing stages 408, 410 may have eight input lines and eight output lines.

The randomization stage 406 of FIG. 5 does not block cell headers 330 (FIG. 3A) from being routed to the first routing stade 408 (FIG. 5). The first and second routing stages 408, 410, however, block certain cell headers 330 (FIG. 3A) according to destination address bits 332 and the priority bits 334 stored in each cell header 330, as described below.

Randomizers 500A–500D

FIG. 6 illustrates one embodiment of a 4x4 randomizer 500 in the scheduler's switch fabric 404 of FIG. 5. The randomizer 500 in FIG. 6 comprises a crossbar/switching network 602, a register 606, a RROM 608, a pointer 610 and a reverse-direction, acknowledgment crossbar 612. The pointer 610, RROM 608, register 606 and crossbar 602 in FIG. 6 operate together to randomly route incoming cell headers 330 (FIG. 3A) from the scheduler port controllers 402A–402P (FIG. 4) on four eight-bit input lines 601A–601D (FIG. 6) to the routing modules 502A–502D (FIG. 5) via four eight-bit output lines 605A–605D (FIG. 6) during an arbitration cycle 808 in FIG. 8. Thus, the cell headers 330 (FIG. 3A) leaving each randomizer 500 (FIG. 5) are evenly distributed among the four routing modules 502A–502D.

The register 606 stores one or more randomization permutations selected by the pointer 610. The register 606 in FIG. 6 is an 8-bit register, but the register 606 may be larger or smaller depending on the size of each randomization permutation stored in the RROM 608. In one configuration, the register 606 comprises two 8-bit registers. The crossbar 602 in FIG. 6 comprises electronic transistors and/or switches that are configured to connect any one of the input lines 601A–601D to any one of the output lines 605A–605D based on a randomization permutation from the register 606.

The contents of the RROM 608 in FIG. 6 for each of the four randomizers 500A–500D (FIG. 5) are preferably the same. The values of the pointers 610 (FIG. 6) in the randomizers 500A–500D (FIG. 5) are preferably different in order to randomly route 16 cells coming into the randomization stage 406 to the first routing stage 408.

For example, the first three randomization permutations in two RROMs 608 (FIG. 6) of two randomizers 500A, 500B (FIG. 5) may be 00100111 (0, 2, 1, 3), 10011100 (2, 1, 3, 0) and 11110010 (3, 2, 1, 0). During a first request-grant cycle 808 (FIG. 8), a pointer 610 (FIG. 6) in the first randomizer 500A (FIG. 5) points to the first randomization permutation, while a pointer 610 (FIG. 6) for the second randomizer 500B (FIG. 5) points to the second randomization permutation. During a second request-grant cycle (FIG. 8), the pointer 610 (FIG. 6) in the first randomizer 500A (FIG. 5) points to the second randomization permutation, while the pointer 610 (FIG. 6) for the second randomizer 500B (FIG. 5) points to the third randomization permutation.

The matching contents of the RROMs 608 (FIG. 6), 210 (FIG. 2) and the synchronized pointers 610 (FIG. 6), 216 (FIG. 2) allow the first stage of routing modules 903A–903D in the switch fabric 104 (FIG. 9) to route cells in the same manner as the randomizers 500A–500D (FIG. 5) route cell headers in the scheduler 106.

The acknowledgement crossbar 612 routes a one-bit acknowledgement signal from an acknowledgment crossbar 716 (FIG. 7A) in a routing module 500 (FIG. 5) to a scheduler port controller 402 (FIG. 4) after a cell header 330 (FIG. 3A) has successfully passed through the first and second routing stages 408, 410 (FIG. 5). The acknowledgement crossbar 612 comprises electronic transistors and/or switches that are configured to connect any one of four one-bit input lines 616A–616D to any one of four one-bit output lines 614A–614D based on the randomization permutation in the register 606. For efficiency, the acknowledgment crossbar 716 in FIG. 7A is used to describe acknowledgment crossbars in the routing modules 502A–502H (FIG. 5) of both the first and second routing stages 408, 410 below.

Routing Modules 502A–502H

Figure 7A:
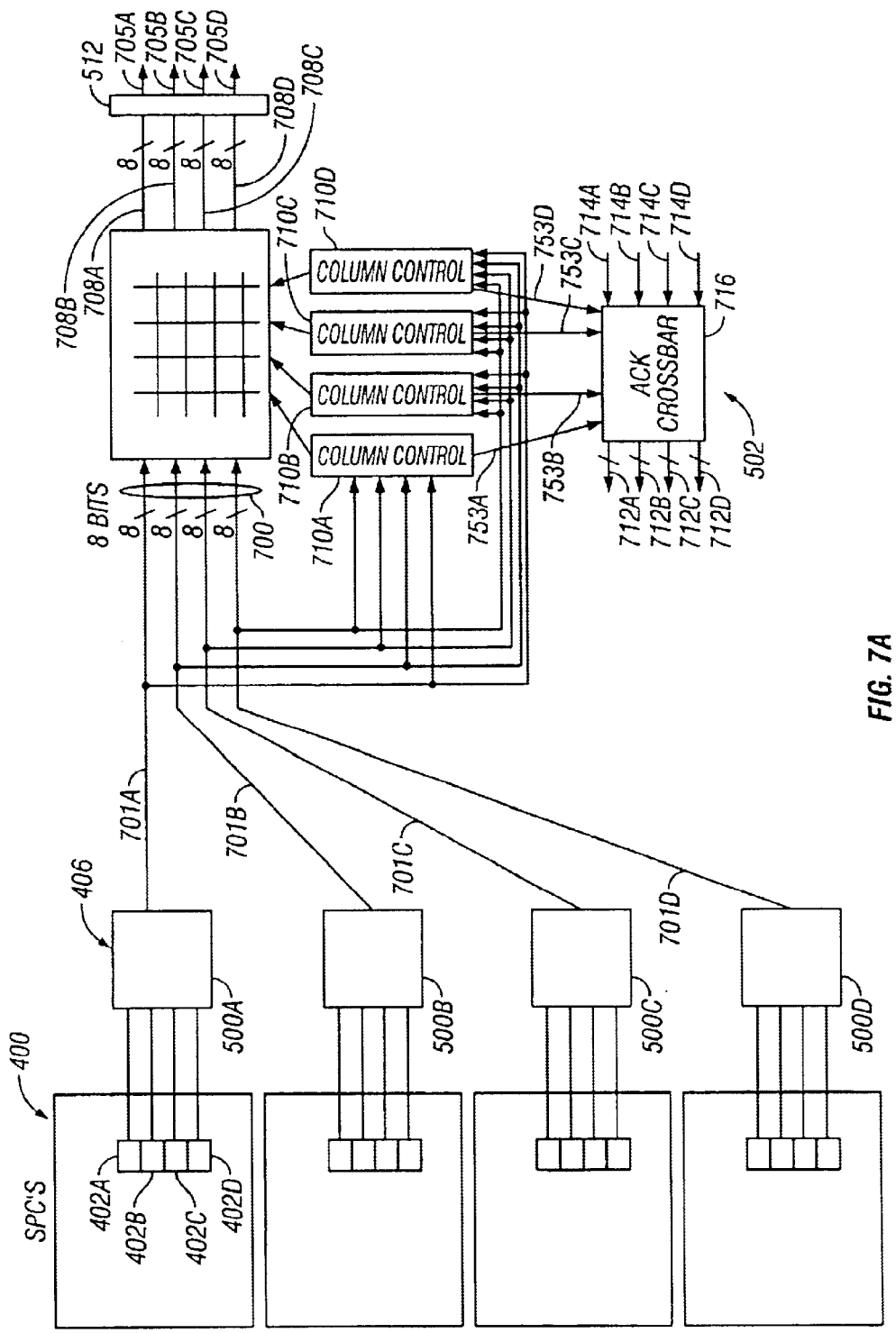
FIG. 7A illustrates one embodiment of a routing module in the scheduler's switch fabric of FIG. 5.

FIG. 7A illustrates one embodiment of a 4×4 routing module 502 within the first and second routing stages 408, 410 in FIG. 5. The routing module 502 in FIG. 7A comprises a routing crossbar/switching network 702, four column control units 710A–710D and a reverse-direction, acknowledgement (ACK) crossbar 716. The incoming cell headers on input lines 701A–701D come from different SPCs 402 (FIG. 4) as determined by the randomizers 500A–500D (FIG. 5). The cell headers are stored in the SPCs 402 (FIG. 4) until the column control units 710A–710D (FIG. 7A) in a routing module 502 (FIG. 5) of the first routing stage 408 examine the destination addresses 332 (FIG. 3A) of the cell headers and resolve any contentions. If one or more cell headers are granted access, the column control units 710A–710D (FIG. 7A) activate the routing crossbar 702. The corresponding SPCs 402 (FIG.4) will then send one or more cell headers through the randomizers 500A–500D (FIG. 5), the activated crossbar 702 (FIG. 7A) and the four eight-bit input lines 701A–701D to a register 512.

The routing crossbar 702 in FIG. 7A comprises electronic transistors and/or switches that are configured to connect one or more of the input lines 701A–701D to one or more of the output lines 708A–708D based on the destination address bits 332 (FIG. 3A), priority bits 334 and valid/invalid bit 336 in each cell header 330. In one embodiment, the crossbar 702 (FIG. 7A) is a combination circuit. The routing crossbar 702 in a routing module 502 (FIG. 5) in the first routing stage 408 transfers one or more cell headers via four eight-bit output lines 708A–708D (FIG. 7A) to a register 512. The register 512 buffers outgoing cell headers until a routing module 502 (FIG. 5) in the second stage 410 is ready to receive the cell headers.

The four column control units 710A–710D (FIG. 7A) also control the acknowledgement crossbar 716 for routing an acknowledgment signal, as described below. The acknowledgment crossbar 716 comprises electronic transistors and/or switches that are configured to connect one or more one-bit input lines 714A–714D to one or more one-bit output lines 712A–712D as determined by the column control units 710A–710D.

Figure 7B:
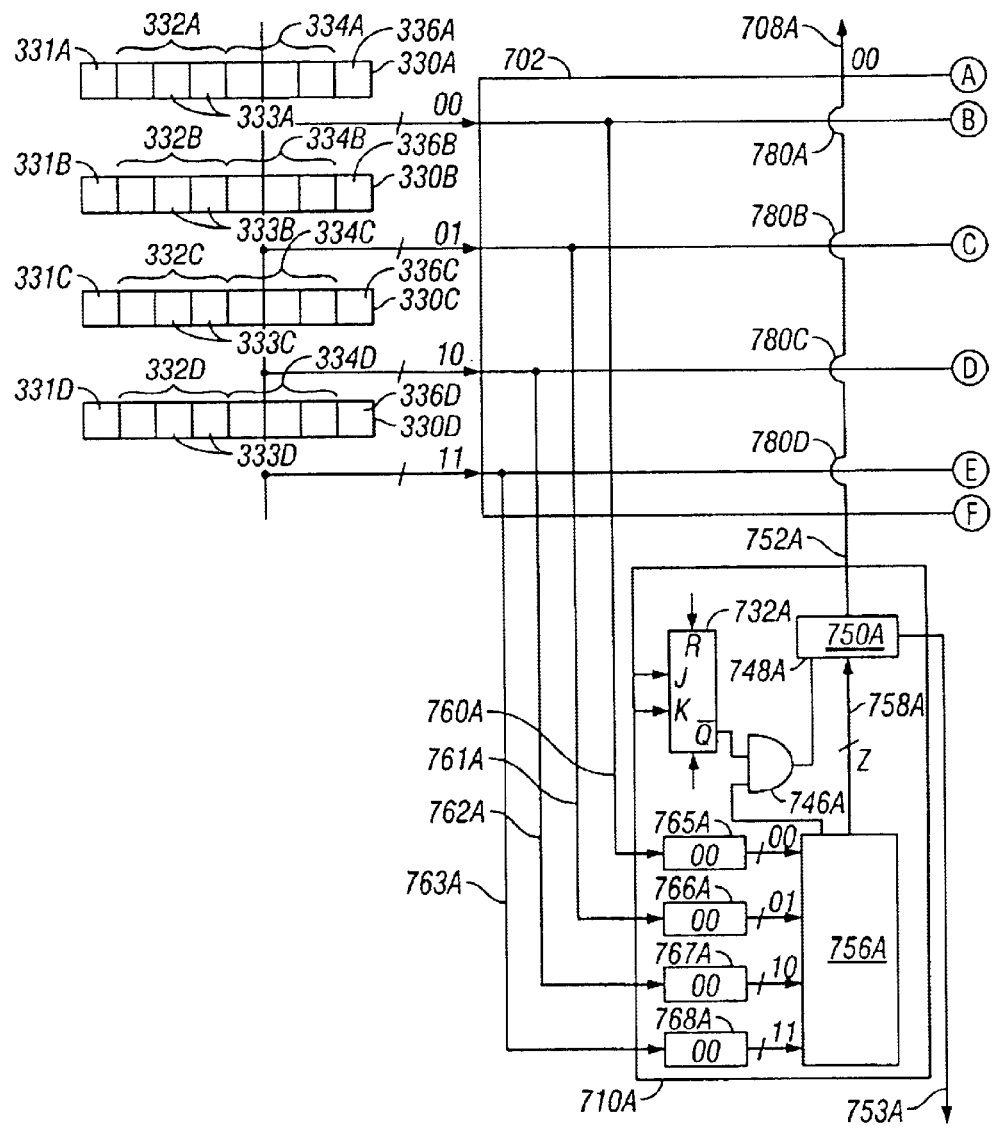
FIG. 7B illustrates one embodiment of a routing crossbar and a plurality of control units of FIG. 7A.
Figure 7B:
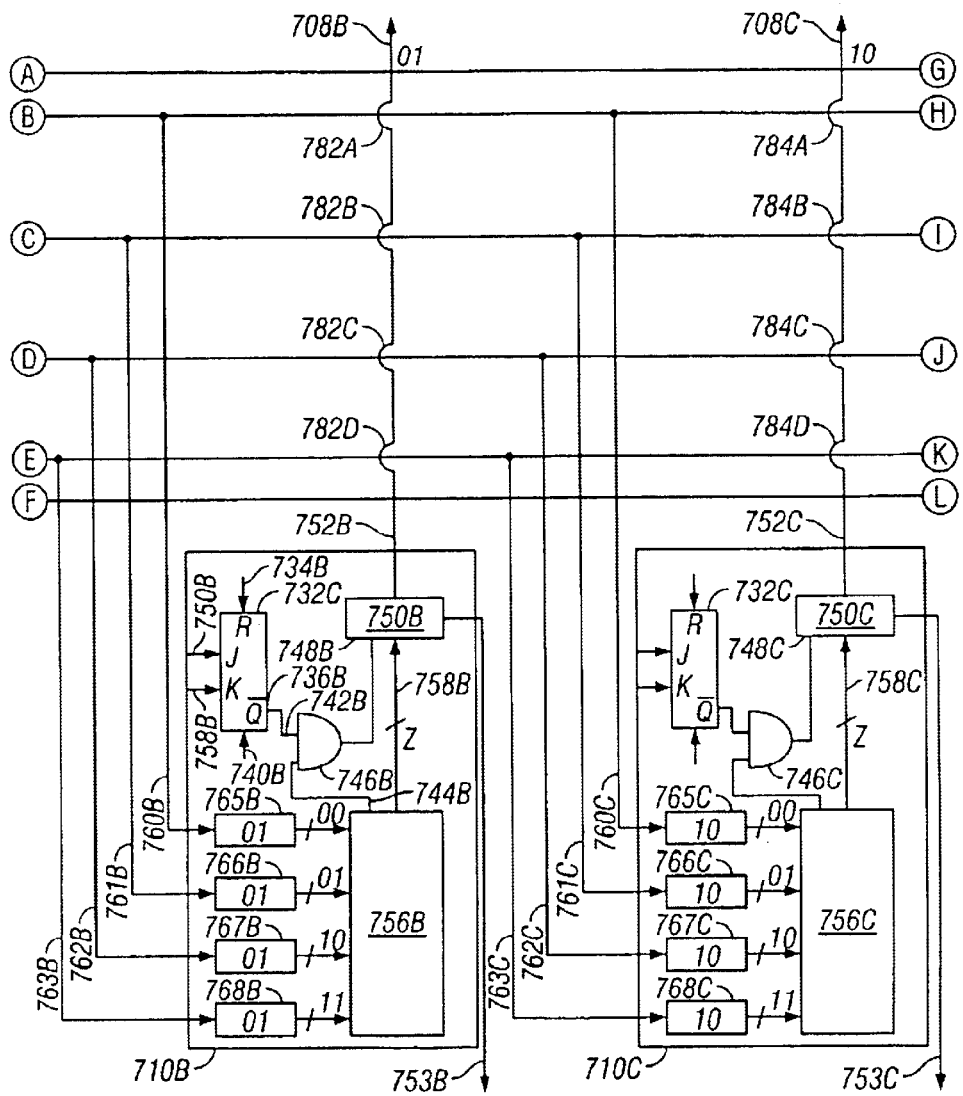
Figure 7B:
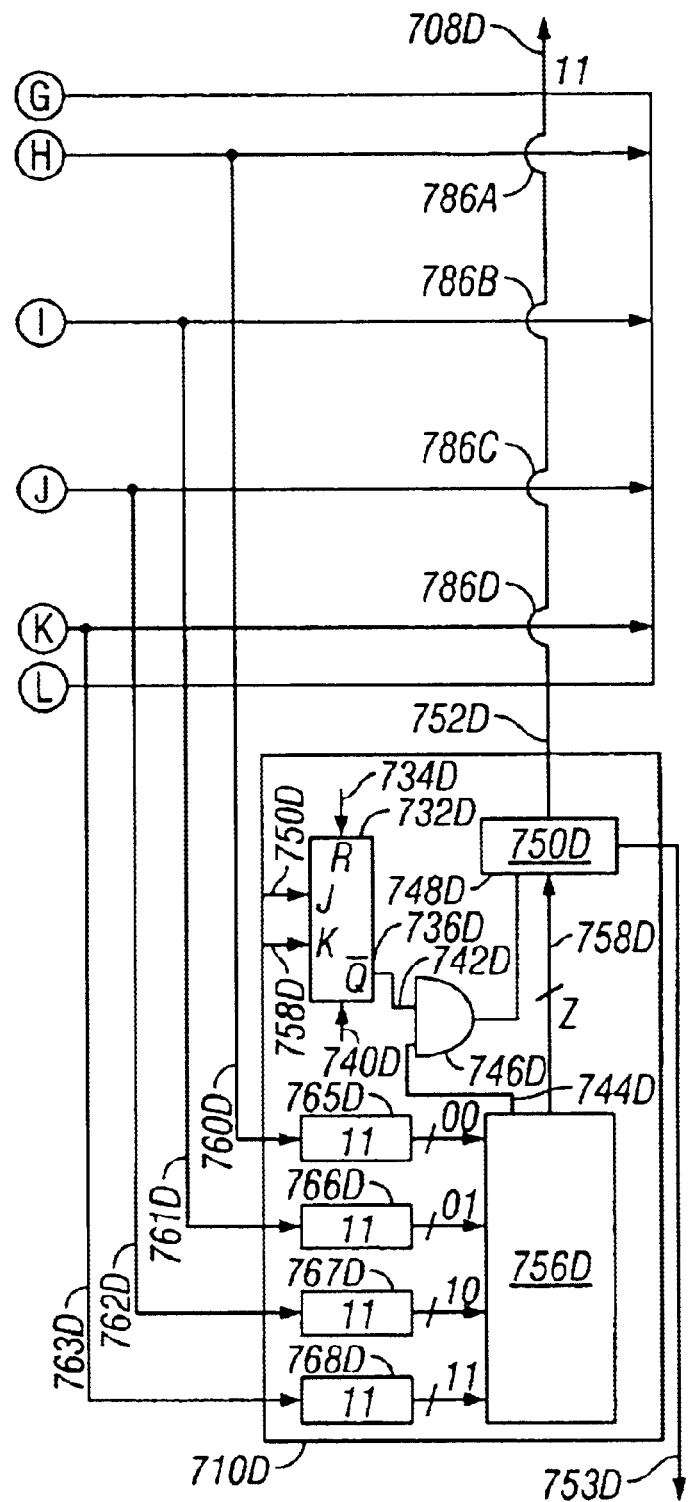

FIG. 7B illustrates one embodiment of the routing crossbar 702 and the control units 710A–710D of FIG. 7A. The routing module 502 (FIG. 7A) may receive cell headers 330A–330D (FIG. 7B) with destination addresses 332A–332D that have the same first or last two bits 331A–331D, 333A–333D. A 'contention' occurs when two or more cell headers 330A–330D on two or more input lines 701A–701D have the same first or last two bits 331A–331D, 333A–333D in their destination addresses 332A–332D in a given clock cycle 804 (FIG. 8). Each of the column control units 710A–710D in FIG. 7B prevents a 'contention' between two or more cell headers 330A–330D from becoming a 'collision' by performing arbitration. Each column control unit 710 receives four cell headers 330A–330D via four input lines 701A–701D, but outputs only one cell header 330, or no cell header 330 if there is no match, on a particular output line 708 in a given clock cycle 804 (FIG. 8).

Figure 7C:
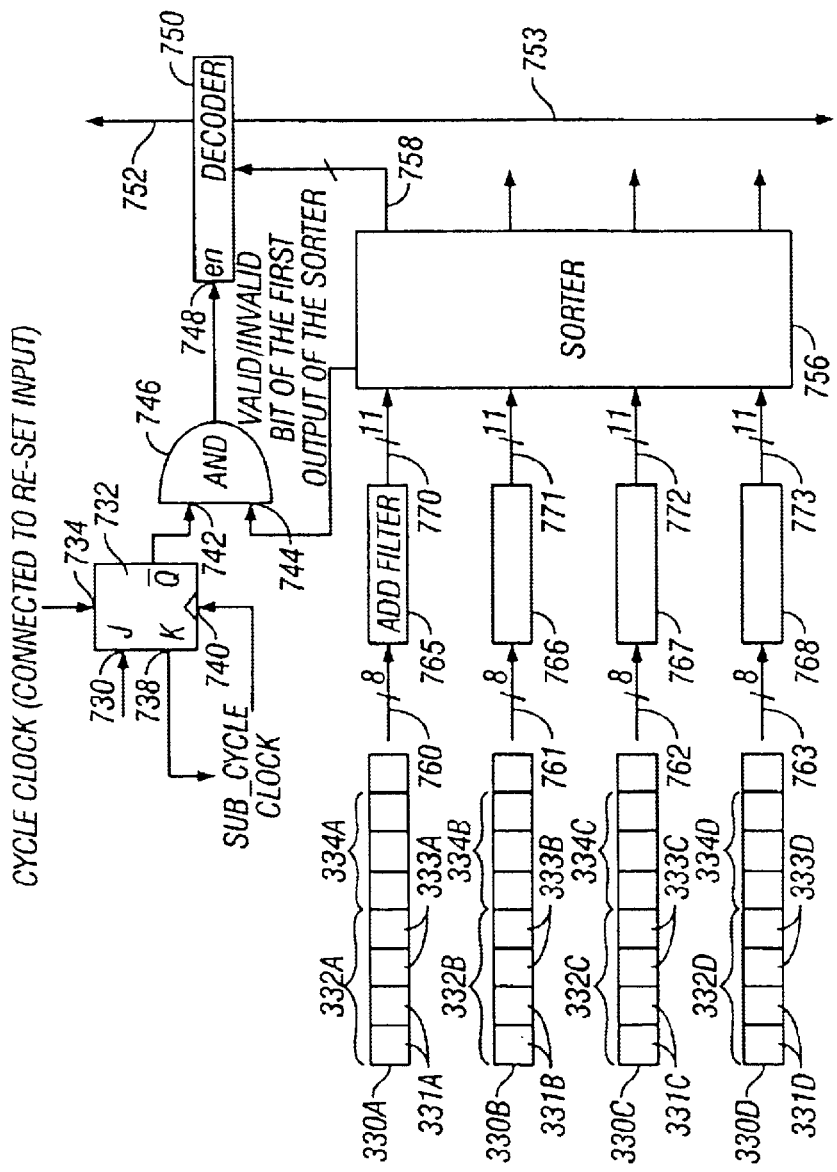
FIG. 7C illustrates one embodiment of a column control unit in the routing module of FIG. 7A.

FIG. 7C illustrates one embodiment of a column control unit 710 in the routing module 502 of FIG. 7A. The control unit 710 in FIG. 7C comprises a JK flip-flop 732, an AND gate 746, a decoder 750, four address matching filters 765–768 and a sorter 756. The decoder 750 in FIG. 7C controls a set of crosspoints 780A–780D, 782A–782D, 784A–784D and 768A–786D (FIG. 7B) of one of the output lines 708A–708D and a set of crosspoints (not shown) of one of the output lines 712A–712D (FIG. 7A) of the acknowledgment crossbar 716. A 'crosspoint' comprises one or more physical or logical contacts that operate together to transmit signals. For example, the decoder 750A (FIG. 7B) in the first column control unit 710A controls a first set of crosspoints 780A–780D of the first output line 708A and a first set of crosspoints (not shown) of the first output line 712B (FIG. 7A) of the acknowledgment crossbar 716.

In one embodiment, the sorter 756 is a 4×4 bitonic sorter comprising a combination circuit. The sorter 756 is implemented with hardware for speed. The operation of the control unit 710 in FIG. 7C is descried with reference to FIGS. 7A, 7B, and 8.

Request-Grant Cycle 808

FIG. 8 illustrates one embodiment of three different clock signals 800, 802, 805 used by the scheduler 106 of FIG. 4. The first clock signal 800 in FIG. 8 has a plurality of basic clock cycles 804A–804H which are used by the routing modules 502A–502H (FIG. 5) to route cell headers 330 (FIG. 3A). During each clock cycle 804, each column control unit 710 in the routing module 502 (FIG. 5) performs a request-grant arbitration between incoming cell headers 330A–330D (FIG. 7B). There can be up to four cell headers 330A–330D reaching the output lines 708A–708D. For example, if there is no contention between four incoming cell headers 330A–330D, the routing module 502 outputs four cell headers 330A–330D via output lines 708A–708D at the end of a clock cycle 804 (FIG. 8).

If two cell headers (such as the first and second cell headers 330A, 330B in FIG. 7B) are contending for one output line (such as the third output line 708C), the column control unit (710C) corresponding to that output line (708C) resolves the contention during a clock cycle 804 (FIG. 8). The routing module 502 (FIG. 7B) outputs one of the contending cell headers (330A or 330B) on the output line (708C) and the other two non-contending cell headers (330C, 330D) on two of the other three output lines (708A, 708B, 708D) at the end of the clock cycle 804 (FIG. 8).

If three cell headers (such as the first, third and fourth cell headers 330A, 330C, 330D in FIG. 7B) are contending for one output line (such as the second output line 708B), the column control unit (710B) corresponding to that output line (708B) resolves the contention during a clock cycle 804

(FIG. 8). The routing module 502 (FIG. 7B) outputs one of the contending cell headers (330A, 330C, or 330D) on the output line (708B) and the non-contending cell header (330B) on one of the other three output lines (708A, 708C or 708D) at the end of the clock cycle 804 (FIG. 8).

If all four cell headers 330A–330D in FIG. 7B are contending for one output line (such as the second output line 708B), the column control unit (710B) corresponding to that output line (708B) resolves the contention during a clock cycle 804 (FIG. 8). The routing module 502 (FIG. 7B) outputs one of the contending cell headers (330A, 330B, 330C or 330D) on the output line (708B) at the end of the clock cycle 804 (FIG. 8).

If two cell headers (such as the first and third cell headers 330A, 330C in FIG. 7B) are contending for one output line (such as the second output line 708B) and the other two cell headers (such as the second and fourth cell headers 330B, 330D) are contending for another output line (such as the third output line 708C), the column control units (710B, 710C) corresponding to those output lines (708B, 708C) resolve the contentions during a clock cycle 804 (FIG. 8). The routing module 502 (FIG. 7B) outputs one of the first two contending cell headers (330A or 330C) on one output line (708B) and one of the second two contending cell headers (330B or 330D) on the other output line (708C) at the end of the clock cycle 804 (FIG. 8).

The second clock signal 802 in FIG. 8 has a plurality of scheduling request-grant sub-cycles 806A–806D. Each request-grant sub-cycle 806 in FIG. 8 represents an end-to-end set up time for a cell header 330 (FIG. 3A) to pass through the scheduler's switch fabric 404 (FIG. 4).

The third clock signal 805 in FIG. 8 has a total request-grant time cycle 808, during which the scheduler 106 (FIG. 4) schedules up to 16 cells to be transferred between the port processors 102A–102P (FIG. 1), depending on the number of contentions between the incoming cell headers 330 (FIG. 3A). The total request-grant cycle 808 in FIG. 8 comprises four request-grant sub-cycles 860A–806D during which the scheduler's switch fabric 404 (FIG. 4) performs up to four rounds of arbitrations. In one embodiment, the request-grant cycle is 20 nanoseconds. With multiple request-grant arbitrations in multiple sub-cycles 806A–806D (FIG. 8), the scheduler 106 (FIG. 4) can achieve a very high throughput.

In another embodiment, the scheduler's switch fabric 404 (FIG. 4) performs eight rounds of request-grant arbitrations in one request-grant cycle 808 (FIG. 8) with eight sub-cycles. Each request-grant cycle equals sixteen clock cycles 804 of the basic clock signal 800. In this embodiment, each scheduler port controller 402 (FIG. 4) splits incoming cell headers 330 (FIG. 3A) from a port processor 102 (FIG. 1) into eight sub-queues (not shown) in the scheduler port controller 402.

In operation, at the beginning of a first request-grant sub-cycle 806A (FIG. 8), each of the scheduler port controllers 402A–402P (FIG. 4) transmits a first cell header 330 (FIG. 3A) from one of the four sub-queues (not shown) in each scheduler port controller 402 (FIG. 4) to a randomizer 500 (FIG. 5) in the scheduler's switch fabric 404. The randomizers 500A–500D of the scheduler's switch fabric 404 receives 16 cell headers 330 (FIG. 3A) and randomly routes the 16 cell headers 330 to the routing modules 502A–502D (FIG. 5) of the first stage 408.

Each of the routing modules 502A–502D in the first routing stage 408 is configured to receive four cell headers 330A–330D (FIG. 7B) from four different SPCs 402 (FIG. 4) through randomizers 500A–500D (FIG. 5). The cell headers 330A–330D (FIG. 7B) are buffered in the four different SPCs 402. Depending on the arbitration success rate of the first 16 cell headers 330, each of the routing modules 502E–502H (FIG. 5) in the second routing stage 410 may receive one to four cell headers 330A–330D (FIG. 7B) from the four routing modules 502A–502D (FIG. 5) of the first stage 408.

In each routing module 502 (FIG. 5), the address matching filters 765A–768A, 765B–768B, 765C–768C, 765D–768D (FIG. 7B) receive cell headers 330A–330D via four eight-bit input lines 760A–763A, 760B–763B, 760C–763C, 760D–763D, which are coupled to the four eight-bit input lines 701A–701D of the crossbar 702. The address matching filters 765A–768A, 765B–768B, 765C–768C, 765D–768D in each of the routing modules 502A–502D (FIG. 5) of the first routing stage 408 examine the first two bits 331A–331D (FIG. 7B) of the destination address fields 332A–332D of the cell headers 330A–330D to determine whether a cell header 330 is intended to be output on a particular output line 708. If the cell has an asserted VALID bit 336 and the first two bits 331 of a destination address field 332 match an address stored in one of the filters 765A–768A, 765B–768B, 765C–768C, 765D–768D, the filter passes the cell header 330 to a corresponding sorter 756.

Similarly, the address matching filters 765A–768A, 765B–768B, 765C–768C, 765D–768D (FIG. 7B) in each of the routing modules 502E–502H (FIG. 5) of the second routing stage 410 examine the last two bits 333A–333D (FIG. 7B) of the destination address fields 332A–332D. If the last two bits 333 of a destination address field 332 match an address stored in one of the filters 765A–768A, 765B–768B, 765C–768C, 765D–768D, the filter passes the cell header 330 to a corresponding sorter 756.

In one example, the input lines 701A–701D (FIG. 7B) of a routing module 502 (FIG. 5) receive four cell headers 330A–330D ('11000101,' '10001001,' '11011011' and '0111101'). The first four bits from the left of each cell header 330 are destination address bits 332. The next three bits from the left are priority bits 334, and the last bit is a VALID/INVALID bit 336. If the four cell headers 330A–330D above are received by a routing module 502 in the first routing stage 408 (FIG. 5), then the first and third cell headers 330A, 330C (FIG. 7B) are contending for the fourth output line 708D because the first two bits 331A, 331C of their destination addresses 332A, 332C are '11'. If the routing module 502 is in the second stage 410 (FIG. 5), then the first and second cell headers 330A, 330B (FIG. 7B) are contending for the first output line 708A because the last two bits 333A, 333B of their destination addresses 332A, 332B are '00'.

Assuming the second routing module 502B (FIG. 5) in the first routing stage 408 receives the ('11000101,' '10001001,' '11011011' and '0111101') cell headers, the first and third cell headers 330A, 330C (FIG. 7B) are contending for the fourth ('11') output line 708D of the routing module 502. The fourth column control unit 710D controls the fourth ('11') output line 708D. The four address matching filters 765D–768D in the fourth column control unit 710D receive the four cell headers 330A–330D via input lines 760D–763D, respectively. The first and third address matching filters 765D, 767D append a MATCH bit of '1' to the first and third cell headers 330A, 330C to indicate a valid match. The second and fourth address matching filters 766D, 768D append a MATCH bit of '0' to the second and fourth cell headers 330B, 330D to indicate that there is not match (the second and fourth cell headers 330B, 330D do not have '11' as the first two bits 331B, 331D of their destination addresses 332B, 332D).

In addition, the address matching filters 765D–768D append two-bit addresses of the input lines 701A–701D that carried the cell headers 330A–330D. Thus, each of the address matching filters 765D–768D output 11 bits (8-bit header 330, a MATCH bit and a two-bit address) to the sorter 756D. The four outputs comprise '11000101100,' '10001001001,' '11011011110' and '0111101011.'

The sorter 756D in FIG. 7B sorts the outputs of the four address matching filters 765D–768D from highest to lowest priority by comparing the appended MATCH bits and the priority bits 334A–334D of the cell headers 330A–330D. The MATCH bits and the priority bits 334A–334D from the four address matching filters 765D–768D are '1010,' '0100,' '0100,' '1101' and '0101,' respectively. The sorter 756D sorts the four outputs to be '11011011110,' '11000101100,' '0111101011' and '10001001001.' The output ('11011011110') from the third address matching filter 767D has the highest priority. The sorter 756D outputs the line address bits ('10') of the output ('11011011110') from the third address matching filter 767D to the decoder 750D. The sorter 756D discards the other three outputs of '11000101100,' '0111101011' and '10001001001.'

If none of the four input cell headers 330A–330D in FIG. 7B have address bits that match the address matching filters 765D–768D of the fourth control unit 710D, the control unit 710D discards the four cell headers 330A–330D and waits for subsequent cell headers on the input lines 701A–701D at the beginning of the next clock cycle 804 in FIG. 8.

Continuing with the example above, the sorter 756D also outputs the VALID/INVALID bit 336C of the cell header 330C to an input port 744D of the AND gate 746D. If the VALID/INVALID bit 336C is '0,' then the cell header 330C is invalid and the decoder 750D does not activate any crosspoints. In this example, the VALID/INVALID bit 336C of the '11011011' cell header 330C is '1.'

Initially, a J input port 730D (FIG. 7B) of the JK flip-flop 732D receives a low level logic signal ('0'). A K-input port 738D is always connected to ground ('0'). The Q output 732D of the JK flip-flop 732D is reset to '0' by the third clock signal 805 (FIG. 8) via the reset input port 734D (FIG. 7B) periodically. Thus, the ~Q output port 736D of the JK flip-flop 732D outputs a high level logic signal ('1') to an input port 742D of the AND gate 746D. Both input ports 742D, 744D of the AND gate 746D receive high level logic signals ('1'), and the AND gate 746D outputs a high level logic signal ('1') to an ENABLE input port 748D of the decoder 750D.

With a high level logic signal ('1') at the ENABLE port 748D, the decoder 750D uses the line address bits ('10') from the sorter 756D to connect/activate the third crosspoint 786C of the fourth output line (column) 708D in the crossbar 702 via line 752D. The crossbar 702 routes the third cell header 330C ('11011011') from the third input line 701C to the fourth output line 708D, which is coupled to the second input line 701B of the fourth routing module 502H (FIG. 5) in the second routing stage 410. The register 511 (FIG. 7A) between the first stage routing module and the second routing module (FIG. 5) will buffer the third cell header 330C ('11011011').

The enabled decoder 750D also uses the line address bits ('10') from the sorter 756D to activate a crosspoint (not shown) in the acknowledgment crossbar 716 (FIG. 7A) via line 753D (FIG. 7B) to connect a fourth input line 714D (FIG. 7A) to a third output line 712C. Thus, the decoders 750A–750D (FIG. 7B) are configured to activate crosspoints of the acknowledgment crossbar 716 (FIG. 7A) that are opposite to (a mirror image of) the crosspoints 780A–780D, 782A–782D, 784A–784D, 786A–786D (FIG. 7B) of the routing crossbar 702.

The second input line 520 (FIG. 5) of the fourth routing module 502H of the second routing stage 410 receives the '11011011' cell header from the second routing module 502B of the first stage 408. The second two bits ('01') of the destination address in the '11011011' cell header indicates that the cell header is intended for the second output line 526 of the fourth routing module 502H of the second routing stage 410.

The fourth routing module 502H may also receive cell headers 330A, 330C, 330D (FIG. 7B), which have '01' as the last two destination address bits 333A, 333C, 333D, from the first, third and fourth routing modules 502A, 502C, 502D (FIG. 5) of the first stage 408 via input lines 518, 522 and 524 respectively, during the same cycle 804 (FIG. 8). In this case, there is a contention for the second output line 526 (FIG. 5) of the fourth routing module 502H of the second routing stage 410.

The second control unit 710B (FIG. 7B) in the fourth routing module 502H (FIG. 5) resolves any contention between the '11011011' cell header on the second input line 520 and any other cell headers 330A, 330C, 330D on input lines 518, 522 and 524 intended for the second output line 526. If the '11011011' cell header has a higher priority than the other cell headers 330A, 330C, 330D intended for the second output line 526, then the decoder 750B in the second control unit 710B will connect the second crosspoint 782B of the second output line 708B.

Acknowledgment Signal

Each output line 708 (FIG. 7B) of each routing module 502 in the second stage 410 is connected to a SPC 402 (FIG. 4). When a cell header 330 (FIG. 7B) reaches an output line 708 of a routing module 502 in the second routing stage 410 (FIG. 5), the cell header reaches a destination port's SPC 402 (FIG. 4). The SPC 402 of the destination port will send an acknowledgment signal to the port processor 102 (FIG. 1) that originally sent the cell header.

Using the example above, the decoder 750B (FIG. 7B) of the fourth routing module 502H (FIG. 5) of the second routing stage 410 activates a crosspoint (not shown) in the acknowledgment crossbar such as the acknowledgment crossbar 716 in (FIG. 7A) of the fourth routing module 502H (FIG. 5) between the second input line 714B (FIG. 7A) and the second output line 712B. The decoder 750B (FIG. 7B) transmits a one-bit acknowledgment signal from the second input line 714B (FIG. 7A) of the acknowledgment crossbar 716 through the activated crosspoint to the second output line 712B.

The second output line 712B of the acknowledgment crossbar 716 in the fourth routing module 502H (FIG. 5) of the second stage 410 is coupled to the fourth input line 714D (FIG. 7A) of the acknowledgment crossbar 716 in the second routing module 502B (FIG. 5) of the first routing stage 408. As described above, the second routing module 502B (FIG. 5) in the first routing stage 408 originally routed the '11011011' cell header to the fourth routing module 502H in the second routing stage 410. The acknowledgment signal is transmitted from the fourth input line 714D (FIG. 7A) of the acknowledgment crossbar 716 in the second routing module 502B (FIG. 5) in the first routing stage 408 to the third output line 712C (FIG. 7A) via an activated crosspoint described above.

The acknowledgment signal is transmitted from the third output line 712C of the acknowledgment crossbar 716 in the second routing module 502B (FIG. 5) in the first routing stage 408 to the second input line 616B (FIG. 6) of the acknowledgment crossbar 612 of the third randomizer 500C (FIG. 5). The third randomizer 500C originally routed the '11011011' cell header to the second routing module 502B in the first routing stage 408 because the second routing module 502B received the '11011011' cell header on the third input line 701C (FIG. 7B). The third randomizer 500C (FIG. 5) transmits the acknowledgment signal to the scheduler port controller 402 (FIG. 4) that originally sent the '11011011' cell header to the randomizer 500C (FIG. 5).

The acknowledgment signal informs the scheduler port controller 402 (FIG. 4) that any contentions between the '11011011' cell header and other cell headers were resolved by the routing modules 502A–502H (FIG. 5), and the '11011011' cell header has been given a transmission request grant. The scheduler port controller 402 (FIG. 4) temporarily records the acknowledgment signal. At the end of a request-grant cycle 808 (FIG. 8), the scheduler port controller 402 (FIG. 4) transmits request grant information (based on the acknowledgment signal) to the port processor 102 (FIG. 1) that originally sent the '11011011' cell header to the scheduler port controller 402 (FIG. 4).

Locking A Control Unit 710

The acknowledgment signal also locks the fourth column control unit 710D (FIG. 7B) in the second routing module 502B (FIG. 5) of the first stage 408 and the second control unit 710B (FIG. 7B) in the fourth routing module 502H (FIG. 5) of the second routing stage 410 where the '11011011' cell header passed. Each locked column control unit 710 (FIG. 7B) prevents subsequent cell headers sent by one of the scheduler port controllers 402A–402P (FIG. 4) during subsequent sub-cycles 806 (FIG. 8) from being routed through the same output line 708 (FIG. 7B) as the '11011011' cell header. Each locked column control unit 710 (FIG. 7B) also prevents subsequent acknowledgment signals from being routed through the same output line 712 (FIG. 7A) of the acknowledgment crossbar 716. Each locked column control unit 710 remains locked for the remainder of the request-grant cycle 808 (FIG. 8).

Using the example above, the decoder 750B (FIG. 7B) in the second column control unit 710B in the fourth routing module 502H (FIG. 5) in the second routing stage 410 transmits the acknowledgment signal ('1') to the J input port 730 (FIG. 7B) of the JK flip-flop 732B. As described above, the second column control unit 710B (FIG. 7B) controls the second output line 708B of the routing module 502H (FIG. 5). The K-input port 738B (FIG. 7B) of the JP flip-flop 732B is always connected to ground ('0'). A high level logic signal ('1') at the J input port 730B and a low level logic signal ('0') at the K input port 738B cause the JK flip-flop 732B to output a low level logic signal ('0') via the ~Q output port 736B to the first input port 742B of the AND gate 746B.

The AND gate 746B outputs a low level logic signal ('0') to the ENABLE port 748B of the decoder 750B. The low level logic signal ('0') at the Enable port 748B disables the decoder 750B from activating any crosspoints 782A–782D on the second output line 708B in the fourth routing module 502H (FIG. 5) in the second routing stage 410 during the remainder of the request-grant cycle 808 (FIG. 8). The decoder 750B (FIG. 7B) is also disabled from activating crosspoints on the output line 712B (FIG. 7A) in the acknowledgment crossbar 716 in the fourth routing module 502H (FIG. 5) in the second routing stage 410 during the remainder of the request-grant cycle 808 (FIG. 8).

After the acknowledgment signal ('1') passes, the J input port 730B (FIG. 7B) receives a low level logic signal ('0') during the next sub-cycle 806 (FIG. 8). But the ~Q output port 736B (FIG. 7B) will continue to output a low level logic signal ('0') until the JK flip-flop 732B is reset by the third clock signal 805 (FIG. 8) via the reset input port 734B (FIG. 7B). The third clock signal 805 (FIG. 8) causes the JK flip-flop 732B (FIG. 7B) to reset at the end of every request-grant cycle 808 (FIG. 8).

Similarly, the J input port 730D (FIG. 7B) of the JK flip-flop 732D in the second routing module 502B (FIG. 5) of the first routing stage 408 receives the acknowledgment signal ('1'). The K-input port 738D (FIG. 7B) of the JK flip-flop 732D in the second routing module 502B (FIG. 5) of the first routing stage 408 is connected to ground ('0'). A high level logic signal ('1') at the J input port 730D (FIG. 7B) and a low level logic signal ('0') at the K input port 738D cause the JK flip-flop 732D to output a low level logic signal ('0') via the ~Q output port 736D to the first input port 742D of the AND gate 746D.

The AND gate 746D outputs a low level logic signal ('0') to the ENABLE port 748D of the decoder 750D. The low level logic signal ('0') at the ENABLE port 748D disables the decoder 750D from activating any crosspoints 786A–786D on the output line 708D in the second routing module 502B (FIG. 5) in the first routing stage 408 during the remainder of the request-grant cycle 808 (FIG. 8). The decoder 750D (FIG. 7B) is also disabled from activating crosspoints on the third output line 712C (FIG. 7A) of the acknowledgment crossbar 716 in the second routing module 502B (FIG. 5) in the first routing stage 408 during the remainder of the request-grant cycle 808 (FIG. 8).

After the acknowledgment signal ('1') passes, the J input port 730D (FIG. 7B) receives a low level logic signal ('0') during the next sub-cycle 806 (FIG. 8). But the ~Q output port 736D (FIG. 7B) will continue to output a low level logic signal ('0') until the JK flip-flop 732D is reset by the third clock signal 805 (FIG. 8) via the reset input port 734D (FIG. 7B). The third clock signal 805 (FIG. 8) causes the JK flip-flop 732D (FIG. 7B) to reset at the end of every request-grant cycle 808 (FIG. 8).

Thus, the activated crosspoints in the routing crossbar 702 (FIG. 7B) and the reverse-direction acknowledgment crossbar 716 (FIG. 7A) in each routing module 502 (FIG. 5) may change at the beginning of each sub-cycle 806 (FIG. 8) until an acknowledgment signal locks one or more of the control units 710A–710D (FIG. 7B) in a routing module 502 (FIG. 5) during a request-grant cycle 808 (FIG. 8).

In contrast, the activated crosspoints in the crossbar 602 (FIG. 6) and the reverse-direction acknowledgment crossbar 612 in each randomizer 500 (FIG. 5) change at the beginning of each request-grant cycle 808 (FIG. 8). In another embodiment, the activated crosspoints in the crossbar 602 (FIG. 6) and the reverse-direction acknowledgment crossbar 612 (FIG. 6) in each randomizer 500 (FIG. 5) change at the beginning of each sub-cycle 806 (FIG. 8).

Subsequent Cell Headers

As mentioned above, each of the scheduler port controllers 402A–402P (FIG. 4) transmits a first cell header 330 (FIG. 3A) from one of the four sub-queues (not shown) in each scheduler port controller 402 (FIG. 4) to the randomization stage 406 at the beginning of a first request-grant sub-cycle 806A (FIG. 8). If a scheduler port controller 402 (FIG. 4) does not receive an acknowledgment signal from the randomization stage 406 at the end of a first sub-cycle 806A (FIG. 8), the scheduler port controller 402 (FIG. 4) sends another cell header 330 (FIG. 3A) from a different sub-queue (not shown) in the scheduler port controller 402 (FIG. 4) to the randomization stage 406. The order of visiting each sub-queue can be fixed, random, and round-robin. In the following example, a fixed-order embodiment is used.

In this embodiment, at the beginning of a first sub-cycle 806A (FIG. 8), the first four scheduler port controllers 402A–402D (FIG. 4) send cell headers from their first sub-queues. The second set of four scheduler port controllers 402E–402H send cell headers from their second sub-queues. The third set of four scheduler port controllers 402I–402L send cell headers from their third sub-queues. And the fourth set of four scheduler port controllers 402M–402P send cell headers from their fourth sub-queues. At the beginning of a second sub-cycle 806B (FIG. 8), the first four scheduler port controllers 402A–402D (FIG. 4) may send cell headers from their second sub-queues. The second set of four scheduler port controllers 402E–402H may send cell headers from their third sub-queues. The third set of four scheduler port controllers 402I–402L may send cell headers from their fourth sub-queues. And the fourth set of four scheduler port controllers 402M–402P may send cell headers from their first sub-queues.

Continuing with the example above, the fourth column control unit 710D (FIG. 7B) of the second routing module 502B (FIG. 5) in the first routing stage 408 discarded the '11000101' cell header because the '11000101' cell header had a lower priority than the '11011011' cell header. The scheduler port controller 402 (FIG. 4) that sent the '11011011' cell header receives an acknowledgment signal from the acknowledgment crossbar 612 (FIG. 6) in the third randomizer 500C (FIG. 5) at the end of a first sub-cycle 806A (FIG. 8).

The scheduler port controller 402 (FIG. 4) that sent the '11000101' cell header does not receive an acknowledgment signal from the third randomizer 500C (FIG. 5) at the end of a first sub-cycle 806A (FIG. 8). The scheduler port controller 402 (FIG. 4) that sent the '11000101' cell header sends another cell header 330 (FIG. 3A) from a different sub-queue (not shown) in the scheduler port controller 402 (FIG. 4) to the third randomizeer 500C (FIG. 5).

If the scheduler port controller 402 (FIG. 4) that sent the '11000101' cell header does not receive an acknowledgment signal from the third randomizer 500C (FIG. 5) at the end of a second sub-cycle 806B (FIG. 8), the scheduler port controller 402 (FIG. 4) sends another cell header 330 (FIG. 3A) from a different sub-queue (not shown) in the scheduler port controller 402 (FIG. 4) to the third randomizer 500C (FIG. 5). The scheduler port controller 402 (FIG. 4) repeats this process until the scheduler port controller 402 receives an acknowledgment signal from the third randomizer 500C (FIG. 5). If the scheduler port controller 402 (FIG. 4) receives an acknowledgment signal, the scheduler port controller 402 does not send any more cell headers 330 (FIG. 3A) to the randomization stage 406 (FIG. 4) until the next request-grant cycle 808 (FIG. 8).

At the end of each request-grant cycle 808, each scheduler port controller 402 (FIG. 4) that received an acknowledgment signal transmits request grant information (based on the acknowledgment signal) to the port processor 102 (FIG. 1) that originally sent the cell headers to the scheduler port controller 402 (FIG. 4).

Thus, within one request-grant cycle 808 (FIG. 8), each scheduler port controller 402 (FIG. 4) may test up to four cell headers from the sub-queues inside the scheduler port controller 402. In one request-grant cycle 808 (FIG. 8), the 16 scheduler port controllers 402A–402P (FIG. 4) may test up to 64 cell headers from the sub-queues inside the scheduler port controllers 402A–402P. A very high throughput can be achieved.

Each port processor 102 (FIG. 1) that receives request grant information from one of the scheduler port controllers 402A–402P (FIG. 4) transmits the request-granted cell to the switch fabric 104 (FIG. 1). The switch fabric 104 routes the cells to their appropriate destination port processors 102A–102P, which output the cells via the output ports 101A–101P to the line card (not shown). There may be some latency between the arrival time and the scheduled transmission time.

Switch Fabric 104

Figure 9A:
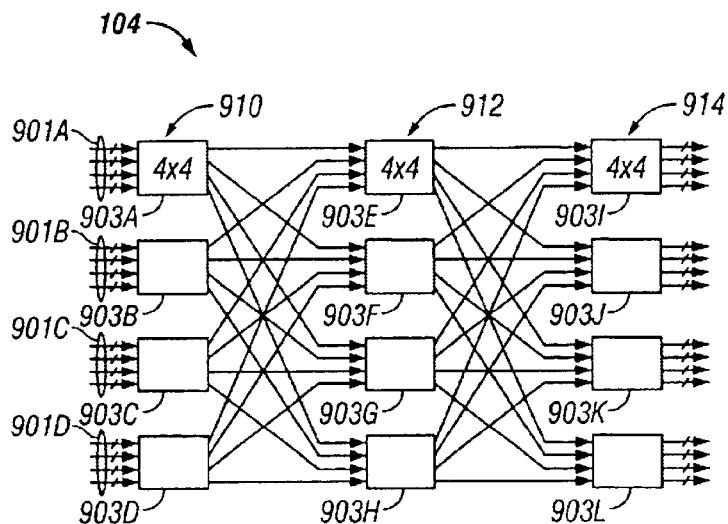
FIG. 9A illustrates one embodiment of a switch fabric in the switch architecture of FIG. 1.

FIG. 9A illustrates one embodiment of a switch fabric 104 in FIG. 1. The switch fabric 104 of FIG. 9A has a first routing stage 910, a second routing stage 912 and a third routing stage 914. The interconnection pattern in FIG. 9A is similar to the interconnection pattern in FIG. 5. In other embodiments, there may be more than four or less than four routing modules in the first routing stage 910 of FIG. 9A. Similarly, there may be more than four or less than four routing modules in the second and/or third routing stages 912, 914 of FIG. 9A. Also, each routing module may have more than four or less than four input and output lines.

In general, the switch fabric 104 in FIG. 9A receives cells from the port processors 102A–102P (FIG. 1) which have been granted access by the scheduler 106. There are no contentions between the cells received by the switch fabric 104 because the scheduler 106 has resolved any contentions. If there are 16 port processors 102A–102P, then the switch fabric 104 receives and switches up to 16 cells to destination port processors 102A–102P during a slot in a time frame.

As described above, each port processor 102 (FIG. 1) takes two bits from the entry of the randomization PROM 210 (FIG. 2) selected by the pointer 216. The two bits are added to the destination port address field 332 (FIG. 3A). The two bits correspond to the output line address of a randomizer 500 (FIG. 5) that performs the function of randomization. Each routing module 903 (FIG. 9A) in the first stage 910 of the switch fabric 104 uses the two bits to route incoming cells. Because the pointers 216 (FIG. 2), 610 (FIG. 6) are synchronized, each routing module 903 (FIG. 9A) in the first stage 910 of the switch fabric 104 uses the same randomization permutation as a corresponding randomizer 500 (FIG. 5). This will prevent any contentions in the routing module 903 (FIG. 9A) in the first stage 910 of the switch fabric 104.

Each routing module 903 (FIG. 9A) in the second stage 912 of the switch fabric 104 routes cells according to the first two bits 331 (FIG. 3A) of the destination addresses 332 in the cell headers 330 of the cells. Each routing module 903 (FIG. 9A) in the third stage 914 routes cells to port processors 102A–102P according to the last two bits 333 (FIG. 3A) of the destination addresses 332 in the cell headers 330 of the cells.

Figure 9B:
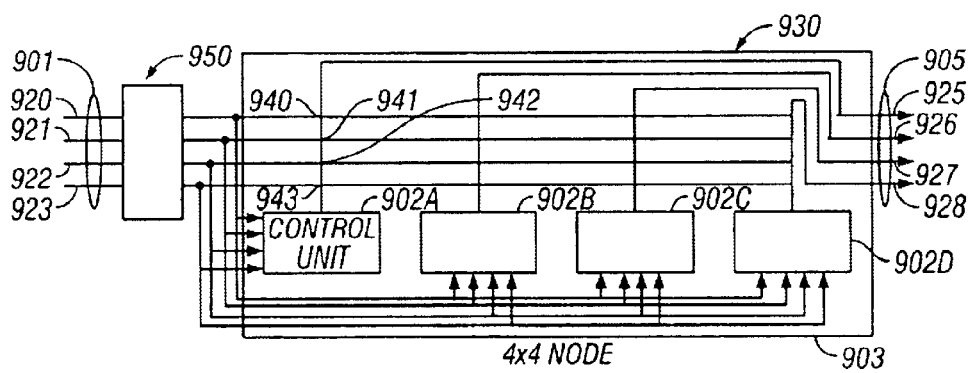
FIG. 9B illustrates one embodiment of a routing module in second and third routing stages of the switch fabric of FIG. 9A.

FIG. 9B illustrates one embodiment of a routing module 903 in the second and third routing stages 910, 912 and 914 of the switch fabric 104 of FIG. 9A. The routing module 903 of FIG. 9B comprises four control units 902A–902D, a register 950, and a crossbar 930 of electronic transistors and/or switches. The incoming cells stay in the register 950 until the crossbar 930 is set up by the control units 902A–902D. Each control unit 902 in FIG. 9B receives cells from the register 950 and controls one of the output lines 925–928. For example, the first control unit 902A (FIG. 9B) controls the crosspoints 940–943 on a first output line 925.

Figure 9C:
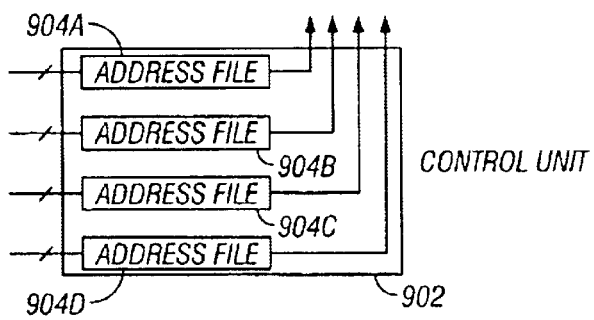
FIG. 9C illustrates one embodiment of a control unit in the routing module of FIG. 9B.

FIG. 9C illustrates one embodiment of a control unit 902 in the routing module 903 of FIG. 9B. The control unit 902 of FIG. 9C comprises four address matching filters 904A–904D. The address matching filters 904A–904D (FIG. 9C) of the first control unit 902A (FIG. 9B) store a '00' value because the first control unit 902A controls the first output line 925. The address matching filters 904A–904D (FIG. 9C) of the second control unit 902B (FIG. 9B) store a '01' value because the second control unit 902B controls the second output line 926. The address matching filters 904A–904D (FIG. 9C) of the third control unit 902C (FIG. 9B) store a '10' value because the third control unit 902C controls the third output line 927. The address matching filters 904A–904D (FIG. 9C) of the fourth control unit 902D (FIG. 9B) store a '11' value because the fourth control unit 902D controls the fourth output line 928.

Each address matching filter 904 (FIG. 9C) receives a cell from one of the input lines 920–923 (FIG. 9B). Each address matching filter 904 (FIG. 9C) in a control unit 902 (FIG. 9B) in a routing module 903 (FIG. 9A) of the second routing stage 912 determines whether the first two bits 331 (FIG. 3A) of the destination address 332 of the cell header 330 match the stored value in the address matching filter 904 (FIG. 9C). If the cell is valid (marked by an asserted VALID bit 336 (FIG. 3A) in the cell header 330) and the first two bits 331 of the destination address 332 of the cell header 330 match the stored value in the address matching filter 904 (FIG. 9C), the address matching filter 904 activates a crosspoint in the crossbar 930 (FIG. 9B) and transmits the cell to an output line coupled to the address matching filter 904.

If the first two bits 331 (FIG. 3A) of the destination address 332 of the cell header 330 do not match the stored value in the address matching filter 904 (FIG. 9C), the address matching filter 904 discards the incoming cell.

Similarly, each address matching filter 904 (FIG. 9C) in a control unit 902 (FIG. 9B) in a routing module 903 (FIG. 9A) of the third routing stage 914 determines whether the last two bits 333 (FIG. 3A) of the destination address 332 of the cell header 330 match the stored value in the address matching filter 904 (FIG. 9C). If the last two bits 333 (FIG. 3A) of the destination address 332 of the cell header 330 match the stored value in the address matching filter 904 (FIG. 9C), the address matching filter 904 activates a crosspoint in the crossbar 930 (FIG. 9B) and transmits the cell to an output line coupled to the address matching filter 904.

If the last two bits 331 (FIG. 3A) of the destination address 332 of the cell header 330 does not match the stored value in the address matching filter 904 (FIG. 9C), the address matching filter 904 discards the incoming cell.

For example, the third address matching filter 904C (FIG. 9C) in the first control unit 902A (FIG. 9B) in the second routing module 903B (FIG. 9A) in the second routing stage 912 of the switch fabric 104 has a stored value of '00' because the first control unit 902A (FIG. 9B) controls the first output line 925. When the third address matching filter 904C (FIG. 9C) in the first control unit 902A (FIG. 9B) in the second routing module 903B (FIG. 9A) in the second routing stage 912 of the switch fabric 104 receives a cell via the third input line 922 (FIG. 9B), the filter 904C (FIG. 9C) examines the first two bits 331 (FIG. 3A) of the destination address 332 of the cell header 330. The address matching filter 904C (FIG. 9C) determines whether the first two bits 331 (FIG. 3A) of the destination address 332 matches the stored value of '00' in the filter 904C (FIG. 9C).

If there is a match, the third address matching filter 904C activates a crosspoint 942 (FIG. 9B) in the crossbar 930 and transmits the cell to the first output line 925, which is coupled to the first control unit 902A. If there is no match, the third address matching filter 904C discards the cell.

The above-described embodiments of the present invention are merely meant to be illustrative and not limiting. Various changes and modifications may be made without departing from the invention in its broader aspects. For example, the control unit 710 (FIG. 7A) may comprise a locking circuit with other components in addition or instead of a JK flip-flop 732 (FIG. 7C) and an AND gate 746. The appended claims encompass such changes and modifications within the spirit and scope of the invention.

What is claimed is:

1. A switching system configured to switch packets of information between ports, each packet comprising a header, each header comprising a destination port address, the switching system comprising:

a plurality of port processors, each port processor being configured to receive and transmit packets of information to and from a line card coupled to each port processor, each port processor being further configured to buffer a plurality of incoming packets from a line card;

a scheduler configured to receive the headers of incoming packets from the port processors, the scheduler being further configured to resolve contentions between headers with destination port addresses that are at least partially similar, the scheduler being further configured to send a request grant to each port processor that sent a header which (a) did not have destination port address that is at least partially similar with destination port addresses of other headers or (b) had a priority level higher than other headers with destination port addresses that are at least partially similar; and a switch fabric configured to receive incoming packets from the port processors as specified by the request grants from the scheduler and transmit the packets to the port processors as specified by the destination port addresses of the packets, wherein each port processor is configured to transmit packets from the switch fabric to a line card;

wherein the scheduler comprises a plurality of randomizers, each randomizer configured to receive a plurality of headers from a plurality of port processors, each randomizer comprising:

a memory storing a plurality of randomization permutations;

a pointer coupled to the memory, the pointer being configured to select one randomization permutation at a time; and a routing crossbar coupled to the memory, the routing crossbar being configured to route sets of headers to a plurality of routing modules coupled to the randomizer according to a randomization permutation selected by the pointer.

2. The switching system of claim 1, wherein each port processor comprises an input buffer comprising a plurality of sub-queues, the input buffer configured to buffer incoming packets from a line card in the plurality of sub-queues based on the destination port addresses of the packet headers.

3. The switching system of claim 1, wherein each port processor comprises:

a memory storing a plurality of randomization permutations, the randomization permutations in the port processor being substantially similar to the randomization permutations in each randomizer; and a pointer coupled to the memory, the pointer being configured to select one randomization permutation at a time, the pointer in the port processor being synchronized with the pointer in the randomizer, wherein each port processor is configured to transfer a packet and a randomization permutation selected by the pointer to a first stage routing module in the switch fabric, the first stage routing module being configured to receive a plurality of packets and one randomization permutation at a time from a plurality of port processors, the first stage routing module being further configured to use one randomization permutation at a time to route the packets to a plurality of second stage routing modules in the switch fabric.

4. The switching system of claim 3, wherein the first stage routing module in the switch fabric uses the same randomization permutation previously used by the randomizer in the scheduler.

5. The switching system of claim 1, wherein each port processor comprises an output buffer configured to buffer packets from the switch fabric before transmitting the packets to a line card.

6. A switching system configured to switch packets of information between ports, each packet comprising a header, each header comprising a destination port address, the switching system comprising:
   a plurality of port processors, each port processor being configured to receive and transmit packets of information to and from a line card coupled to each port processor, each port processor being further configured to buffer a plurality of incoming packets from a line card;
   a scheduler configured to receive the headers of incoming packets from the port processors, the scheduler being further configured to resolve contentions between headers with destination port addresses that are at least partially similar, the scheduler being further configured to send a request grant to each port processor that sent a header which (a) did not have destination port address that is at least partially similar with destination port addresses of other headers or (b) had a priority level higher than other headers with destination port addresses that are at least partially similar; and
   a switch fabric configured to receive incoming packets from the port processors as specified by the request grants from the scheduler and transmit the packets to the port processors as specified by the destination port addresses of the packets, wherein each port processor is configured to transmit packets from the switch fabric to a line card;
   wherein the scheduler comprises a first stage of routing modules, each routing module of the first stage being coupled to a plurality of port processors, each routing module of the first stage being configured to (a) receive a plurality of incoming headers from a plurality of port processors; (b) resolve contentions between headers with a similar first set of bits in the destination port addresses of the headers by comparing priority bits in the headers; and (c) output any con-contending headers and one or more contending headers with the highest priority bits on separate output lines.

7. The switching system of claim 6, wherein the scheduler further comprises a second stage of routing modules, each routing module of the second stage being coupled to a plurality of routing modules of the first stage, each routing module of the second stage being configured to (a) receive a plurality of headers from a plurality of routing modules of the first stage; (b) resolve contentions between headers with a similar second set of bits in the destination port addresses of the headers by comparing priority bits of the headers; and (c) output any non-contending headers and one or more contending headers with the highest priority bits on separate output lines.

8. The switching system of claim 7, wherein the scheduler further comprises a plurality of scheduler port controllers coupled between the port processors and the first stage, each scheduler port controller comprising a plurality of sub-queues, each scheduler port controller being configured to buffer incoming headers from a port processor in the sub-queues based on the destination port addresses of the headers, each scheduler port controller being further configured to transfer a header from a first sub-queue to a routing module of the first stage at the beginning of a first sub-cycle clock signal, if the scheduler port controller does not receive an acknowledgment signal from the first stage at the end of the first sub-cycle, the scheduler port controller transfers a header from a second sub-queue to the routing module of the first stage at the beginning of a second sub-cycle clock signal.

9. The switching system of claim 8, wherein the scheduler further comprises acknowledgment crossbars in the first and second stages, each acknowledgment crossbar configured to transmit one or more acknowledgment signals.

10. The switching system of claim 6, wherein each routing module is further configured to output only headers with asserted valid bits in the headers.

11. The switching system of claim 6, wherein each routing module comprises:
   a routing crossbar coupled to a plurality of port processors, the routing crossbar comprising a plurality of crosspoints configured to connect a plurality of input lines to a plurality of output lines, each input line being coupled to port processor;
   a plurality of control units coupled to the crossbar, each control unit being configured to (a) determine whether destination addresses of incoming headers match an address of one of the output lines of the routing crossbar; (b) resolve contentions between headers with destination addresses that match an address of one of the output lines by comparing priority bits of the headers; and (c) activate a crosspoint in the crossbar to output a non-contending header or a contending header with the highest priority bits on one of the output lines of the crossbar; and
   an acknowledgment crossbar coupled to the control units, the acknowledgment crossbar comprising a plurality of electronic transistors configured to connect a plurality of input lines to a plurality of output lines, the output lines being coupled to a plurality of port processors, the acknowledgment crossbar being configured to transfer one or more acknowledgment signals to one or more port processors.

12. The switching system of claim 11, wherein each routing module further comprises an input register coupled between a plurality of port processors and the input lines of the routing crossbar, the input register being configured to buffer a plurality of incoming headers from the plurality of port processors until one or more crosspoints in the crossbar has been activated by one or more control units.

13. The switching system of claim 11, wherein each control unit comprises:
   a plurality of address matching filters, each address matching filter being coupled to one of the input lines of the routing module, each address matching filter being configured to append a match bit to a header with a destination address that matches a pre-stored value;
   a sorter coupled to the plurality of address matching filters, the sorter configured to sort one or more headers output by the address matching filters according to any match bits and priority bits of the headers;

a decoder coupled to the sorter, the decoder being configured to activate a crosspoint in the crossbar to output a header with an asserted match bit and priority bits that are higher than other headers with asserted match bits.

14. The switching system of claim 13, wherein each control unit further comprises a locking circuit coupled to the decoder, the locking circuit being configured to lock the decoder if a previous header passed through the control unit during a request-grant clock cycle.

15. The switching system of claim 6, wherein the scheduler is a single integrated chip.

16. The switching system of claim 6, wherein the switch fabric comprises a first stage of routing modules, each routing module of the first stage being coupled to a plurality of port processors, each routing module of the first stage being configured to (a) receive a plurality of incoming headers from a plurality of port processors; and (b) route headers according to the destination addresses of the headers.

17. The switching system of claim 6, wherein the switch fabric comprises a second stage of routing modules, each routing module of the second stage being coupled to a plurality of routing modules of the first stage, each routing module of the second stage being configured to (a) receive a plurality of incoming headers from a plurality of the routing modules of the first stage; and (b) route headers to the port processors according to the destination addresses of the headers.

18. The switching system of claim 6, wherein the scheduler is configured to receive 64 headers from the port processors, resolve one or more contentions between the headers in 20 nanoseconds or less, and output about 16 request grants to the port processors.

19. The switching system of claim 6, wherein the scheduler is configured to receive 128 headers from the port processors, resolve one or more contentions between the headers in 20 nanoseconds or less, and output about 16 request grants to the port processors.

20. The switching system of claim 6, wherein the scheduler is configured to receive headers from 32 port processors, resolve one or more contentions between the headers, and output request grants two or more of the port processors.

21. The switching system of claim 6, wherein the scheduler is configured to receive headers from 64 or more port processors, resolve one or more contentions between the headers, and output request grants two or more of the port processors.

22. A scheduler in a switching system configured to switch packets of information between ports, each packet comprising a header, each header comprising a destination port address and a priority level, the scheduler comprising:

a plurality of randomizers, each randomizer being coupled to a set of port processors, each randomizer being configured to receive headers from the set of port processors and randomly output the headers;

a first stage of routing modules, each routing module in the first stage being coupled to at least two randomizers, each routing module in the first stage being configured to receive headers from at least two randomizers, each routing module in the first stage being configured to output one or more headers with a destination address that matches a pre-stored value and have a higher priority level than other headers with destination addresses that match the pre-stored value; and a second stage of routing modules, each routing module in the second stage being coupled to at least two routing modules in the first stage, each routing module in the second stage being configured to receive headers from at least two routing modules in the first stage, each routing module in the second stage being configured to output an acknowledgment signal to each port processors that sent a header with a destination address that matches a pre-stored value and has a higher priority level than other headers with destination addresses that match the pre-stored value.

23. The scheduler of claim 22, further comprising a plurality of scheduler port controllers, each scheduler port controller being coupled between a port processor and a randomizer, each scheduler port controller being configured to receive a plurality of headers from a port processor.

24. A method of switching packets of information between ports, each packet comprising a header, each header comprising a destination port address and a priority level, the method comprising:

buffering a plurality of incoming packets;

resolving contentions between headers with destination addresses that are at least partially similar by selecting headers with a higher priority level than other headers with at least partially similar destination addresses;

sending one or more request grants to one or more port processors, each request grant representing a header that (a) did not contend with other headers or (b) had a higher priority level than other headers with at least partially similar destination addresses; and switching one or more packets between the port processors based on the one or more request grants;

wherein resolving contentions comprises:
randomly routing headers of packets from a plurality of port processors to a routing stage;
in the routing stage, determining whether two or more headers have destination addresses that are at least partially similar;
from the two or more headers with destination addresses that are at least partially similar, selecting a header with a higher priority level; and sending an acknowledgment signal to each port processor that sent a header that (a) did not contend with other headers or (b) had a higher priority level than other headers with at least partially similar destination addresses.

25. The method of claim 24, further comprising locking each control unit in the routing stage that output a header that did not contend with other headers or had a higher priority level than other headers with at least partially similar destination addresses.

* * * * *